US012454044B2

(12) United States Patent
Ebner et al.

(10) Patent No.: US 12,454,044 B2
(45) Date of Patent: Oct. 28, 2025

(54) ATTACHMENT FOR POWERED HAMMER

(71) Applicant: MILWAUKEE ELECTRIC TOOL CORPORATION, Brookfield, WI (US)

(72) Inventors: Jeremy R. Ebner, East Troy, WI (US); Jonathan E. Abbott, Wilmington, DE (US); Przemyslaw M. Krol, Milwaukee, WI (US); Randolph McHugh, Sullivan, WI (US)

(73) Assignee: Milwaukee Electric Tool Corporation, Brookfield, WI (US)

(*) Notice: Subject to any disclaimer, the term of this patent is extended or adjusted under 35 U.S.C. 154(b) by 0 days.

(21) Appl. No.: 18/444,061

(22) Filed: Feb. 16, 2024

(65) Prior Publication Data

US 2024/0181617 A1 Jun. 6, 2024

Related U.S. Application Data

(60) Division of application No. 17/963,345, filed on Oct. 11, 2022, now Pat. No. 11,945,086, which is a continuation of application No. 16/275,384, filed on Feb. 14, 2019, now Pat. No. 11,498,196.

(60) Provisional application No. 62/748,670, filed on Oct. 22, 2018, provisional application No. 62/636,228, filed on Feb. 28, 2018.

(51) Int. Cl.
*B25D 17/00* (2006.01)
*B25D 17/04* (2006.01)

(52) U.S. Cl.
CPC .......... *B25D 17/005* (2013.01); *B25D 17/043* (2013.01); *B25D 2217/0073* (2013.01)

(58) Field of Classification Search
None
See application file for complete search history.

(56) References Cited

U.S. PATENT DOCUMENTS

| | | | | |
|---|---|---|---|---|
| 2,330,360 | A | | 9/1943 | Hill |
| 2,604,300 | A | | 7/1952 | Polselli et al. |
| 2,629,985 | A | | 3/1953 | McDowell |
| 2,634,157 | A | | 4/1953 | Haddock |
| 2,667,752 | A | | 2/1954 | Moseley |
| 2,693,086 | A | | 11/1954 | Caruthers et al. |
| 2,802,340 | A | | 8/1957 | Tallman |
| 3,034,588 | A | | 5/1962 | Matheny, Jr. et al. |
| 3,149,851 | A | | 9/1964 | Adams |
| 3,216,734 | A | | 11/1965 | Thompson |
| 3,243,190 | A | * | 3/1966 | Peregrine ................ E02D 13/10 294/104 |

(Continued)

FOREIGN PATENT DOCUMENTS

| | | | |
|---|---|---|---|
| DE | 3619241 | A1 | 12/1987 |
| DE | 4118665 | A1 | 12/1992 |

(Continued)

*Primary Examiner* — Tanzim Imam
(74) *Attorney, Agent, or Firm* — Quarles & Brady LLP

(57) ABSTRACT

A method of driving a rod into the ground comprises coupling an impact portion of an attachment to a powered hammer, positioning the rod between a first jaw of the attachment and a second jaw of the attachment, activating a first motor to move the first jaw toward the second jaw, such that the rod is clamped between the two jaws, and activating a second motor to drive an axial impact mechanism of the powered hammer to deliver repeated axial impacts to the impact portion of the attachment.

7 Claims, 18 Drawing Sheets

(56) References Cited

U.S. PATENT DOCUMENTS

| | | | | | |
|---|---|---|---|---|---|
| 3,391,435 | A | * | 7/1968 | Lebelle | E02D 13/10 279/4.11 |
| 3,700,047 | A | | 10/1972 | Gartner | |
| 3,735,822 | A | | 5/1973 | Deike | |
| 3,747,690 | A | | 7/1973 | Deike | |
| 3,792,739 | A | | 2/1974 | Deike | |
| 3,961,672 | A | | 6/1976 | Welsch et al. | |
| 4,263,975 | A | | 4/1981 | Dagnaud | |
| 4,448,264 | A | | 5/1984 | Peyton | |
| 4,487,273 | A | | 12/1984 | Smolyanitsky et al. | |
| 4,516,662 | A | | 5/1985 | Kostylev et al. | |
| 4,557,409 | A | | 12/1985 | Hecock et al. | |
| 4,641,715 | A | * | 2/1987 | Stinson | E02D 7/02 173/132 |
| 4,776,407 | A | | 10/1988 | Kostylev et al. | |
| 4,799,557 | A | | 1/1989 | Jacquemet | |
| 4,819,740 | A | * | 4/1989 | Warrington | E02D 7/00 173/162.1 |
| 4,971,479 | A | | 11/1990 | Byers, Sr. et al. | |
| 5,010,710 | A | * | 4/1991 | Gray | E04H 17/263 173/90 |
| 5,029,427 | A | * | 7/1991 | Jewett | E04H 17/263 52/741.11 |
| 5,086,849 | A | | 2/1992 | Dahl | |
| 5,167,288 | A | | 12/1992 | McNeil et al. | |
| 5,174,386 | A | | 12/1992 | Crover | |
| 5,174,388 | A | | 12/1992 | Williams et al. | |
| 5,188,187 | A | | 2/1993 | Mumper | |
| 5,248,002 | A | | 9/1993 | Williams | |
| 5,337,836 | A | | 8/1994 | Williams | |
| 5,462,126 | A | | 10/1995 | Wallace | |
| 5,466,101 | A | | 11/1995 | Meyen | |
| 5,549,168 | A | * | 8/1996 | Sadler | E02D 7/18 173/129 |
| 5,667,021 | A | | 9/1997 | Bailey et al. | |
| 5,673,903 | A | | 10/1997 | Lewis | |
| 5,819,857 | A | | 10/1998 | Rohrer | |
| 5,863,154 | A | | 1/1999 | Olsen | |
| 6,092,814 | A | | 7/2000 | Kageler | |
| 6,179,300 | B1 | | 1/2001 | Baumann et al. | |
| 6,364,031 | B1 | | 4/2002 | Amicangelo | |
| 6,588,514 | B2 | | 7/2003 | Kozak | |
| 6,659,473 | B2 | | 12/2003 | Below et al. | |
| 6,823,573 | B2 | | 11/2004 | Morrison et al. | |
| 6,889,777 | B2 | | 5/2005 | Boley et al. | |
| 7,296,636 | B1 | | 11/2007 | Vreeland | |
| 7,303,027 | B1 | | 12/2007 | Laemmer | |
| 7,314,098 | B2 | | 1/2008 | Miller | |
| 8,544,946 | B2 | | 10/2013 | Holden | |
| 8,640,787 | B2 | | 2/2014 | Rohrer | |
| 9,051,705 | B1 | | 6/2015 | Rose | |
| 9,206,578 | B1 | | 12/2015 | Rose | |
| 9,765,496 | B2 | | 9/2017 | Lindeman et al. | |
| 9,803,388 | B2 | | 10/2017 | Cunningham | |
| 2002/0139548 | A1 | | 10/2002 | Connelly, Jr. | |
| 2003/0173095 | A1 | | 9/2003 | Boley et al. | |
| 2005/0220602 | A1 | | 10/2005 | Boley et al. | |
| 2006/0113456 | A1 | | 6/2006 | Miller | |
| 2007/0199726 | A1 | | 8/2007 | Boley et al. | |
| 2008/0000661 | A1 | * | 1/2008 | Miller | E04H 17/263 173/152 |
| 2008/0006418 | A1 | * | 1/2008 | Berghauser | B25D 17/06 173/122 |
| 2011/0155403 | A1 | | 6/2011 | Rohrer | |
| 2012/0217058 | A1 | * | 8/2012 | Higby | H02G 13/40 174/70 R |
| 2015/0000948 | A1 | | 1/2015 | Lindeman et al. | |
| 2015/0217419 | A1 | | 8/2015 | Whitmer et al. | |
| 2016/0067856 | A1 | * | 3/2016 | Bito | B25D 17/005 173/128 |
| 2016/0361829 | A1 | | 12/2016 | Hyma et al. | |
| 2017/0218657 | A1 | | 8/2017 | Hedley | |
| 2018/0019526 | A1 | | 1/2018 | Stillwell et al. | |

FOREIGN PATENT DOCUMENTS

| | | | | | |
|---|---|---|---|---|---|
| DE | 9401164 | U1 | | 4/1994 | |
| DE | 202013012082 | U1 | | 2/2015 | |
| EP | 0110853 | A1 | | 6/1984 | |
| EP | 1079027 | A2 | | 2/2001 | |
| GB | 2007742 | A | | 5/1979 | |
| KR | 101602096 | B1 | * | 3/2016 | B25D 11/00 |
| WO | 03002835 | A1 | | 1/2003 | |
| WO | 03076728 | A2 | | 9/2003 | |
| WO | 2009035392 | A1 | | 3/2009 | |

* cited by examiner

ATTACHMENT FOR POWERED HAMMER

CROSS-REFERENCE TO RELATED APPLICATIONS

This application is a divisional of co-pending U.S. patent application Ser. No. 17/963,345 filed on Oct. 11, 2022, which is a continuation of U.S. patent application Ser. No. 16/275,384 filed on Feb. 14, 2019, now U.S. Pat. No. 11,498,196, which claims priority to U.S. Provisional Patent Application No. 62/748,670 filed on Oct. 22, 2018 and U.S. Provisional Patent Application No. 62/636,228 filed on Feb. 28, 2018, the entire contents of all of which are incorporated herein by reference.

FIELD OF THE INVENTION

The present invention relates to powered hammers, and more particularly to attachments for use with powered hammers.

BACKGROUND OF THE INVENTION

Long metal ground rods are inserted into the ground near transmission line towers to electrically ground the transmission lines. The rods are positioned vertically on the ground, and an operator subsequently applies downward impacts upon a top end of the rod to drive it into the ground.

SUMMARY OF THE INVENTION

The present invention provides, in one aspect, a method of driving a rod into the ground. The method comprises coupling an impact portion of an attachment to a powered hammer, positioning the rod between a first jaw of the attachment and a second jaw of the attachment, activating a first motor to move the first jaw toward the second jaw, such that the rod is clamped between the two jaws, and activating a second motor to drive an axial impact mechanism of the powered hammer to deliver repeated axial impacts to the impact portion of the attachment.

The present invention provides, in another aspect, a method of driving a rod into the ground. The method comprises coupling an impact portion of an attachment to a powered hammer, positioning the rod between a first jaw of the attachment and a second jaw of the attachment, pivoting the first jaw relative to the attachment such that the first jaw is engaged with the rod, pivoting the second jaw relative to the attachment such that the second jaw is engaged with the rod, and activating the powered hammer to deliver repeated axial impacts to the impact portion of the attachment.

The present invention provides, in yet another aspect, a method of driving a rod into the ground. The method comprises coupling an impact portion of an attachment to a powered hammer, the impact portion extending from a first side of the attachment, engaging an end of the rod with an anvil of the attachment, the anvil extending from a second side of the attachment opposite the first side, aligning the rod within a longitudinal groove of the attachment, and activating the powered hammer to deliver repeated axial impacts to the impact portion of the attachment.

Figure 1:
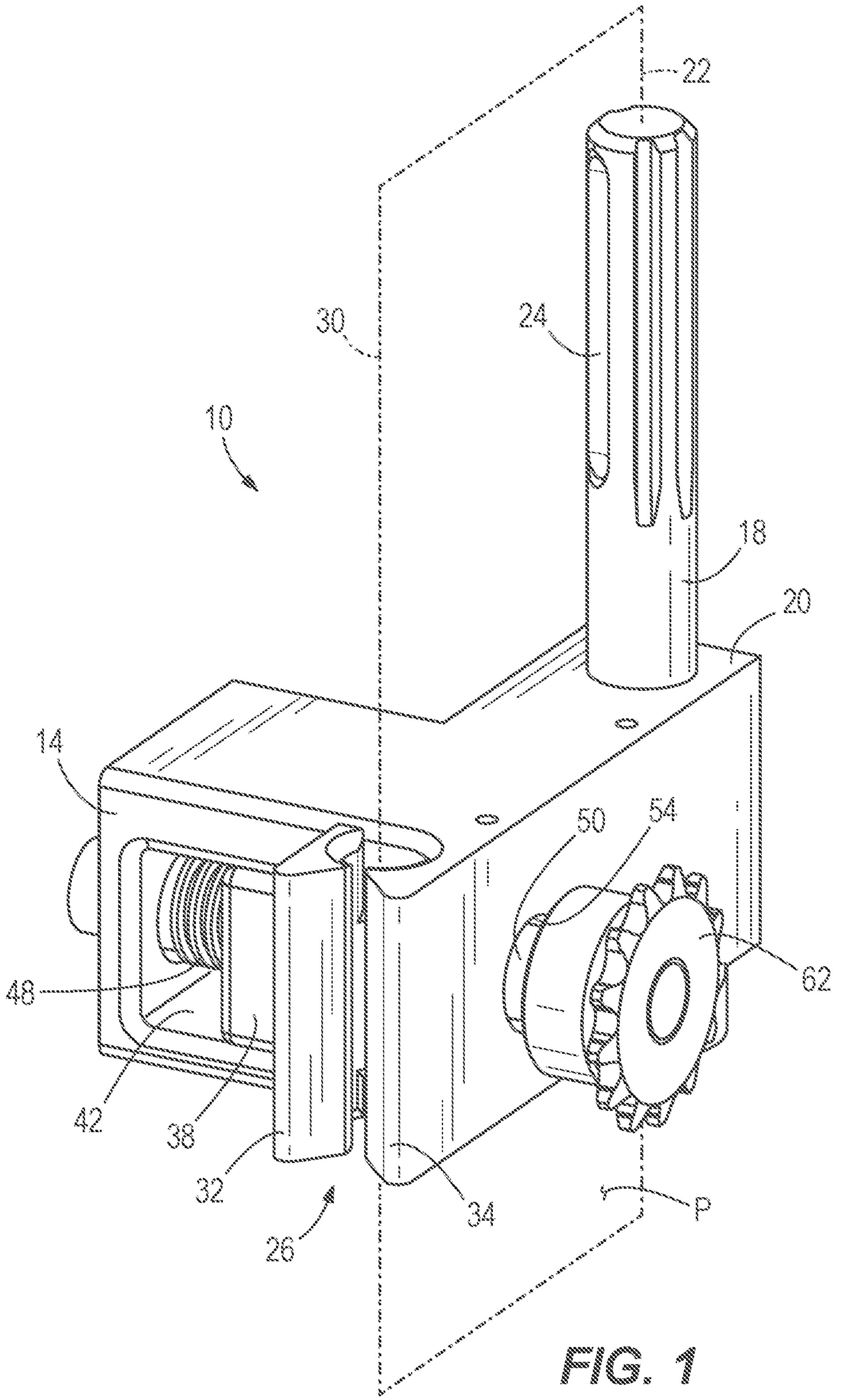
FIG. 1 is a perspective view of an attachment for use with a powered hammer.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

FIGS. 1-4 illustrate an attachment 10 configured for use with a reciprocating power tool (e.g., a powered hammer 12, FIG. 5) to drive a rod 13 into the ground. The attachment 10 includes a body 14 having an impact portion, such as post

18, configured to receive repeated impacts from the powered hammer 12. In other embodiments, the impact portion can take other forms or shapes. Post 18 extends from a first side 20 of the body 14 and defines a first axis 22, along which the repeated impacts from the powered hammer 12 are imparted. The post 18 defines one or more longitudinal grooves 24 that are parallel to the first axis 22. The grooves 24 are configured to assist in mating the attachment 10 to the powered hammer 12, as described in further detail below.

Figure 3:
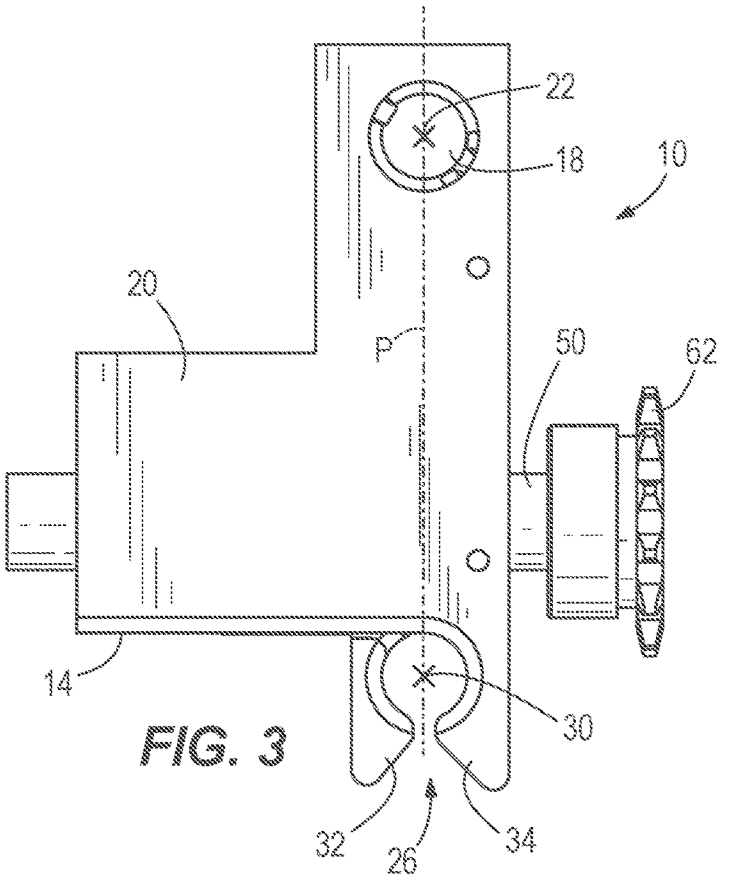
FIG. 3 is a top plan view of the attachment of FIG. 1.
Figure 4:
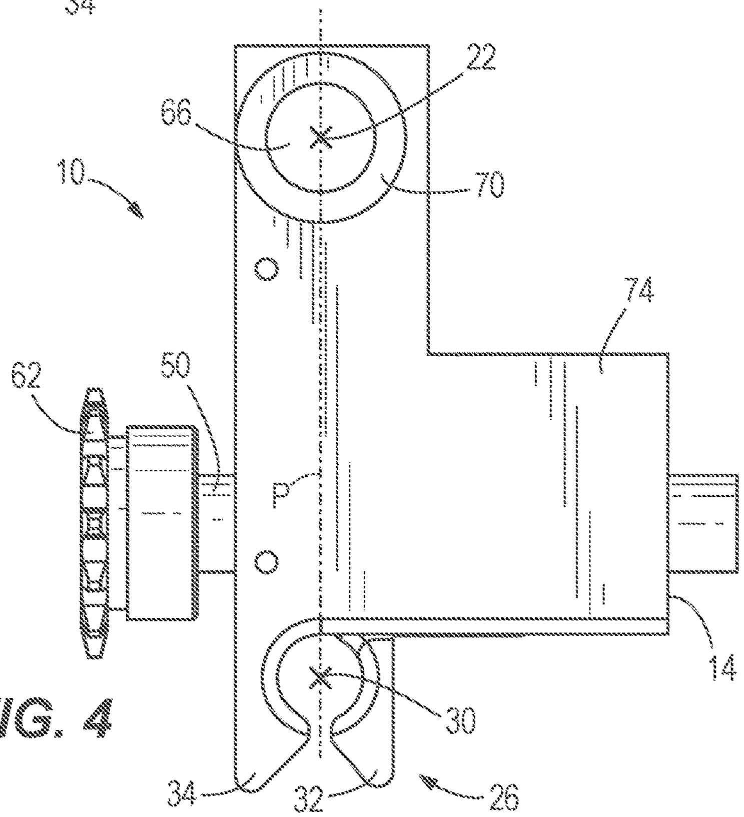
FIG. 4 is a bottom plan view of the attachment of FIG. 1.

The attachment 10 also includes a receiving portion in which the rod 13 is receivable that defines a second axis 30 along which the rod 13 is positioned when received in the receiving portion. In the different embodiments of attachments illustrated in FIGS. 1-16, the receiving portion is a clamping portion. For instance, in the embodiment illustrated in FIGS. 1-9, the receiving portion is a clamping portion 26. The clamping portion 26 defines the second axis 30 along which the rod 13 is positioned when clamped in the clamping portion 26. The second axis 30 is parallel with the first axis 22. The clamping portion 26 includes a first jaw 32 that is moveable with respect to the body 14 and a second jaw 34 that is fixed to the body 14. The first jaw 32 is coupled to a block 38 that is configured to slide within a recess 42 in the body 14 between an open position, in which the rod 13 is insertable between and removable from the first and second jaws 32, 34, and a clamped position shown in FIGS. 1 and 3-5, in which the rod 13 is securely clamped between the first and second jaws 32, 34 and is not removable therefrom. As shown in FIGS. 1, 3 and 4, the second axis 30 is defined between the first and second jaws 32, 34 when the sliding block 38 is in the clamped position.

Figure 9:
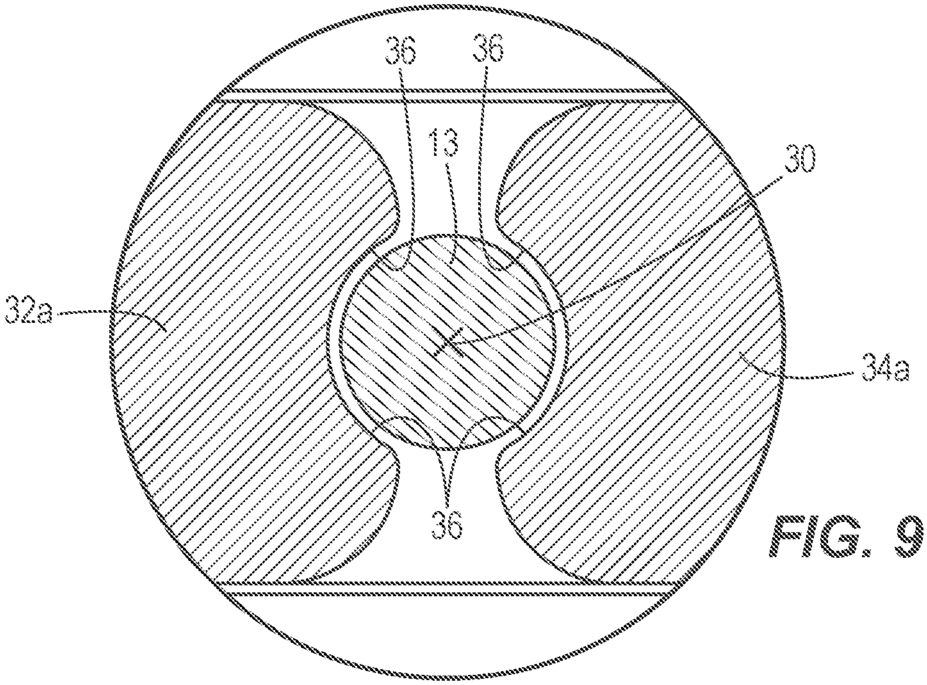
FIG. 9 is a cross-sectional view of an alternative configuration of the jaws of the attachment of FIG. 1

As shown in FIGS. 3 and 4, each of the jaws 32, 34 include an arcuate profile corresponding with the cylindrical shape of the rod 13. As such, contact pressure exerted by the jaws 32, 34 is generally distributed evenly over the outer periphery of the rod 13. However, an alternate configuration of the jaws **32*a*, 34*a* is shown in FIG. 9, in which the clamping surfaces 36 of the respective jaws 32*a*, 34*a* deviate from the cylindrical profile of the rod 13. Specifically, the outermost portions of each of the clamping surfaces 36 may taper toward the rod 13 and therefore contact the rod 13 at an angle, forming a wedge to increase the contact pressure applied to the rod 13. In addition, the non-circular profile of the clamping surfaces 36 of the respective jaws 32*a*, 34*a* would allow the attachment 10 to be used with a greater number of different rod sizes compared to the jaws 32, 34**.

Figure 2:
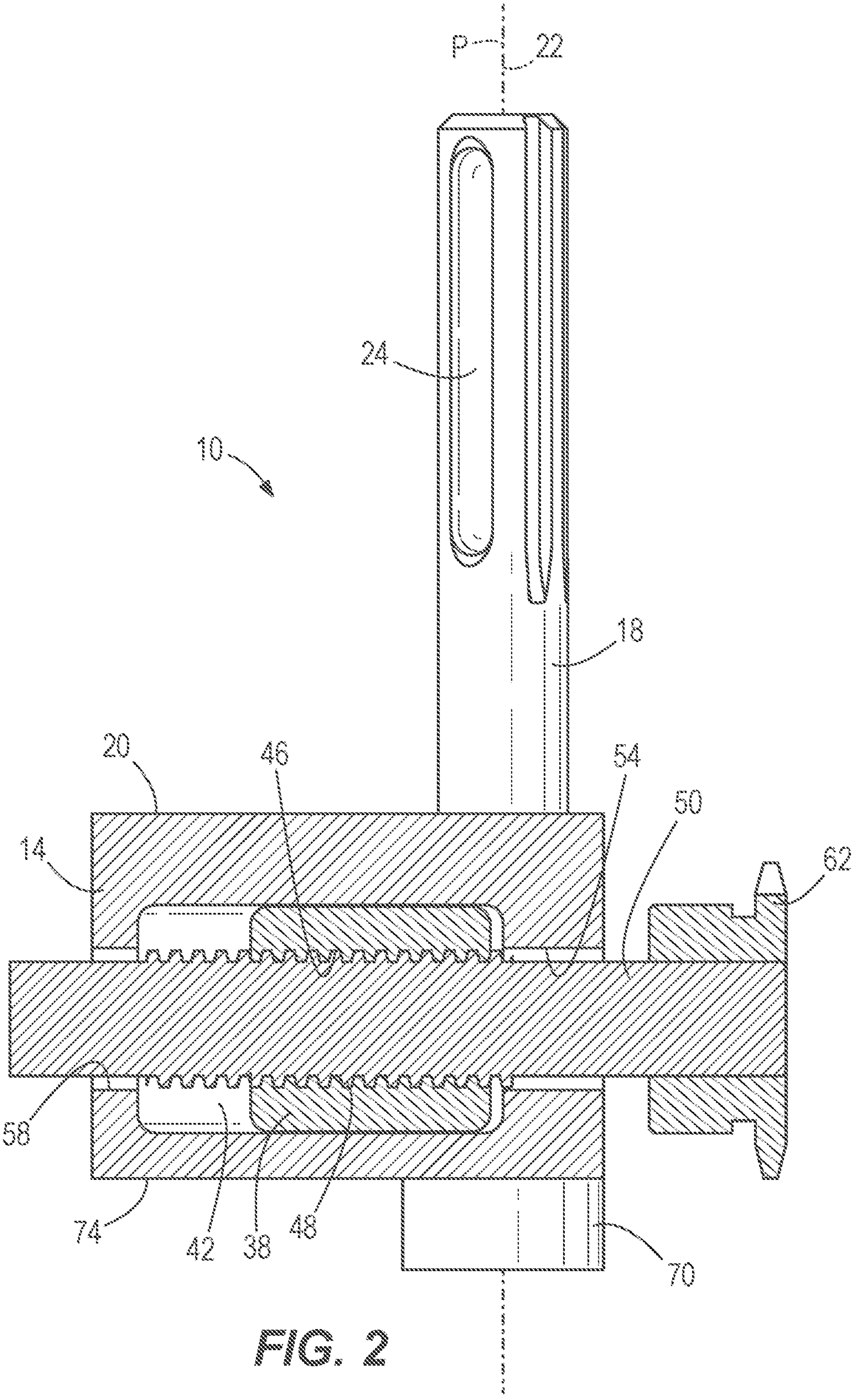
FIG. 2 is a cross-sectional view of the attachment of FIG. 1.

As shown in FIG. 2, the sliding block 38 defines a threaded bore 46 that receives a threaded portion 48 of a screw 50. The screw 50 extends through a first bore 54 in the body 14, the threaded bore 46 of the sliding block 38, and a second bore 58. The screw 50 is rotatable with respect to the body 14 but is axially constrained with respect to the body 14 via, e.g., retaining clips. Thus, as the screw 50 rotates, the screw 50 does not translate with respect to the body 14. Because screw 50 does not translate, as screw 50 rotates, the sliding block 38 is forced to translate in the recess 42 via the connection between the threaded bore 46 and the threaded portion 48 of the screw 50. Thus, as the screw 50 rotates, the sliding block 38 can move between the open position and clamped position via the threaded bore 46, and as the sliding block 38 moves, the first jaw 32 moves in a direction transverse to a plane P that includes the first and second axes 22, 30. A first gear 62 is coupled for co-rotation with the screw 50, such that rotation of the first gear 62 results in rotation of the screw 50, and thus movement of the sliding block 38 within the recess 42.

As shown in FIG. 4, a bore 66 is defined in a cylindrical protrusion 70 extending from a second side 74 of the body 14 that is opposite the first side 20. In the illustrated embodiment, the bore 66 is coaxial with the post 18, and thus also defines the first axis 22. However, in other embodiments, the bore 66 may be offset from the post 18. In other embodiments, such as the embodiment of FIG. 20, the bore 66 may be defined within the body 14 itself, rather than a protrusion 70 extending from the body 14. As will be explained in further detail below, the rod 13 is alternatively receivable within the clamping portion 26 and the bore 66.

Figure 5:
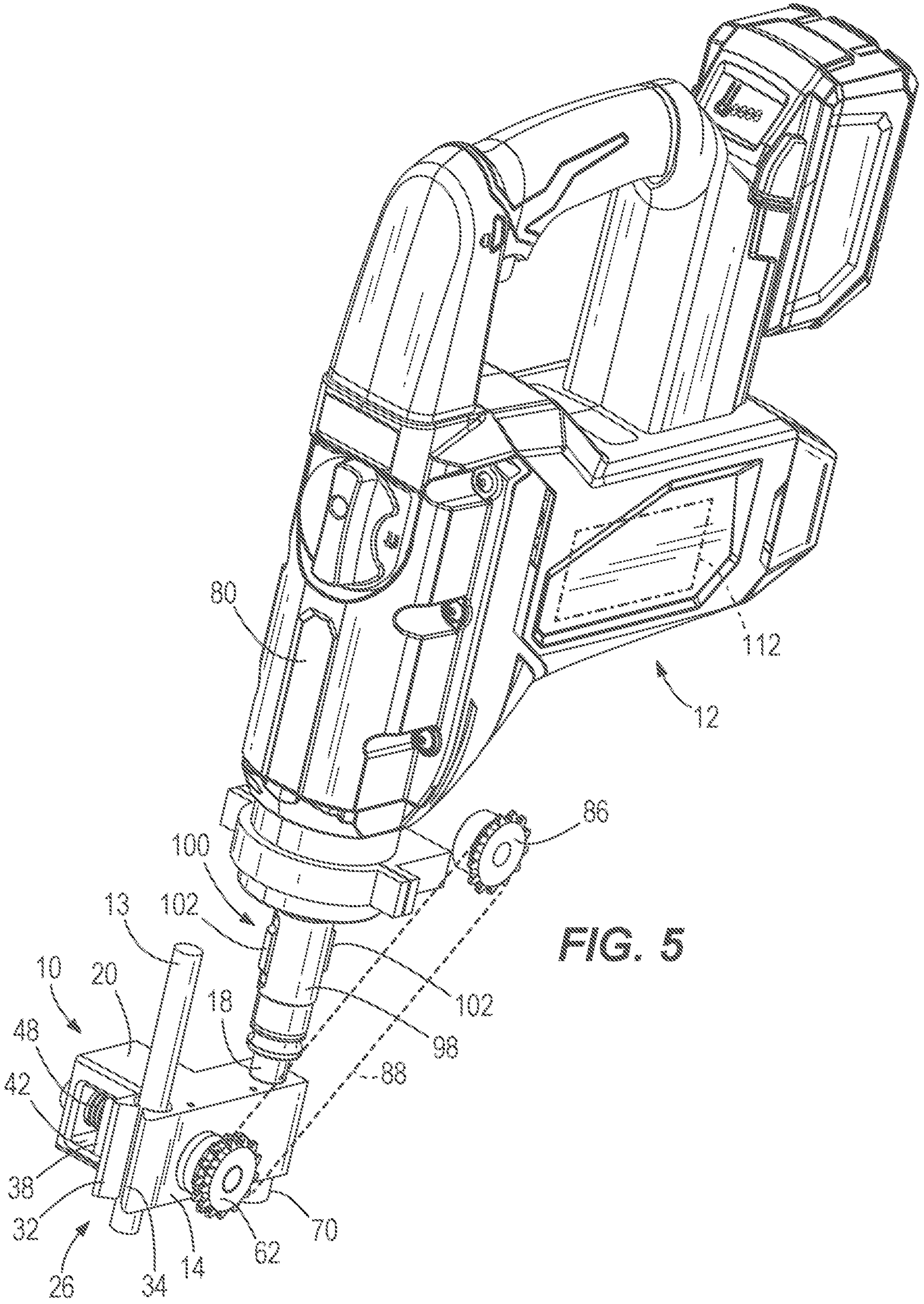
FIG. 5 is a perspective view of the attachment of FIG. 1 coupled to a powered hammer.
Figure 6:
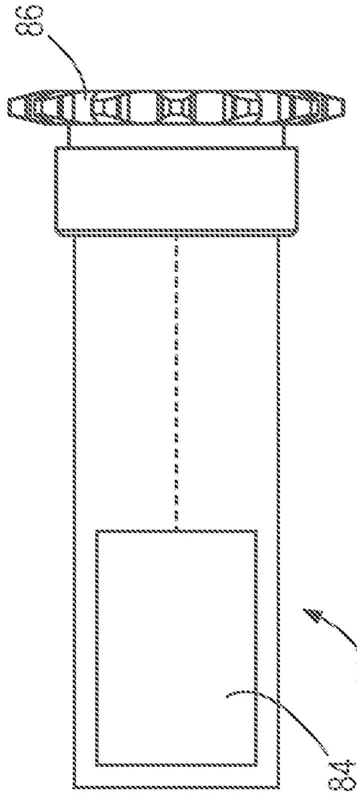
FIG. 6 is a cross-sectional view of an auxiliary motor unit of the powered hammer of FIG. 5.

FIG. 5 illustrates the attachment 10 coupled to the powered hammer 12, which includes a housing 80, while the rod 13 is clamped in the clamping portion 26 of the attachment 10 between first and second jaws 32, 34. As shown schematically in FIG. 6, an auxiliary motor unit 82 includes a drive assembly 84 that drives a second gear 86, which is the only portion of the auxiliary motor unit 82 shown in FIG. 5. The auxiliary motor unit 82 is removably coupled to or incorporated with the powered hammer 12. The drive assembly 84, shown schematically in FIG. 6, includes a first motor, a first transmission, and an output shaft that drives the second gear 86. The second gear 86 is configured to drive the first gear 62 via a linkage, such as a chain 88, shown schematically in FIG. 5. Alternatively, a belt and pulley system may be used instead of the chain 88 and gears 62, 86. Furthermore, the motor in the drive assembly 84 could be omitted, and the torque for rotating the first and/or second gears 62, 86 may be supplied by the user of the powered hammer 12 and attachment 10 (e.g., by a hand crank, etc.).

Figure 7:
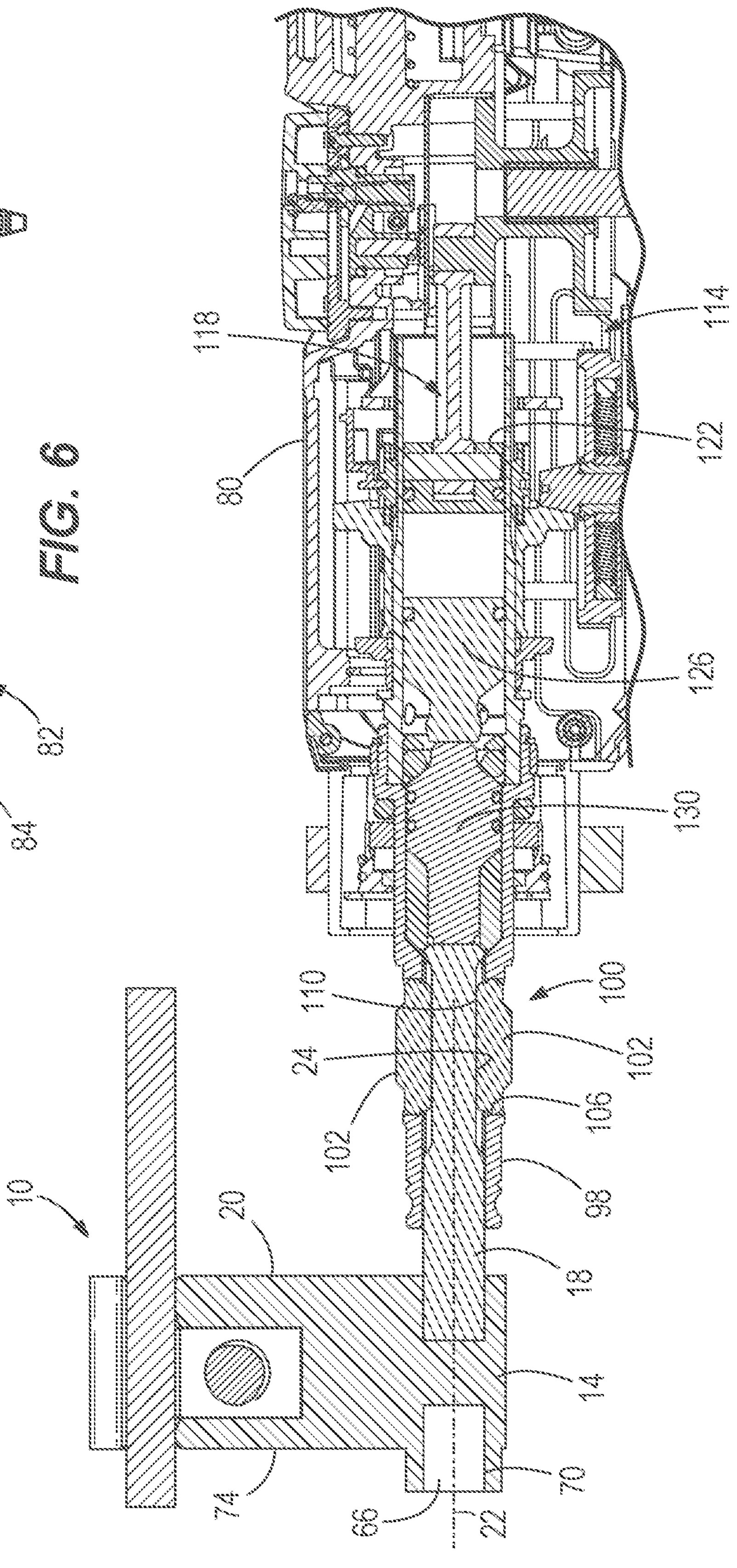
FIG. 7 is a cross-sectional view of the attachment of FIG. 1 coupled to the powered hammer of FIG. 5.
Figure 8:
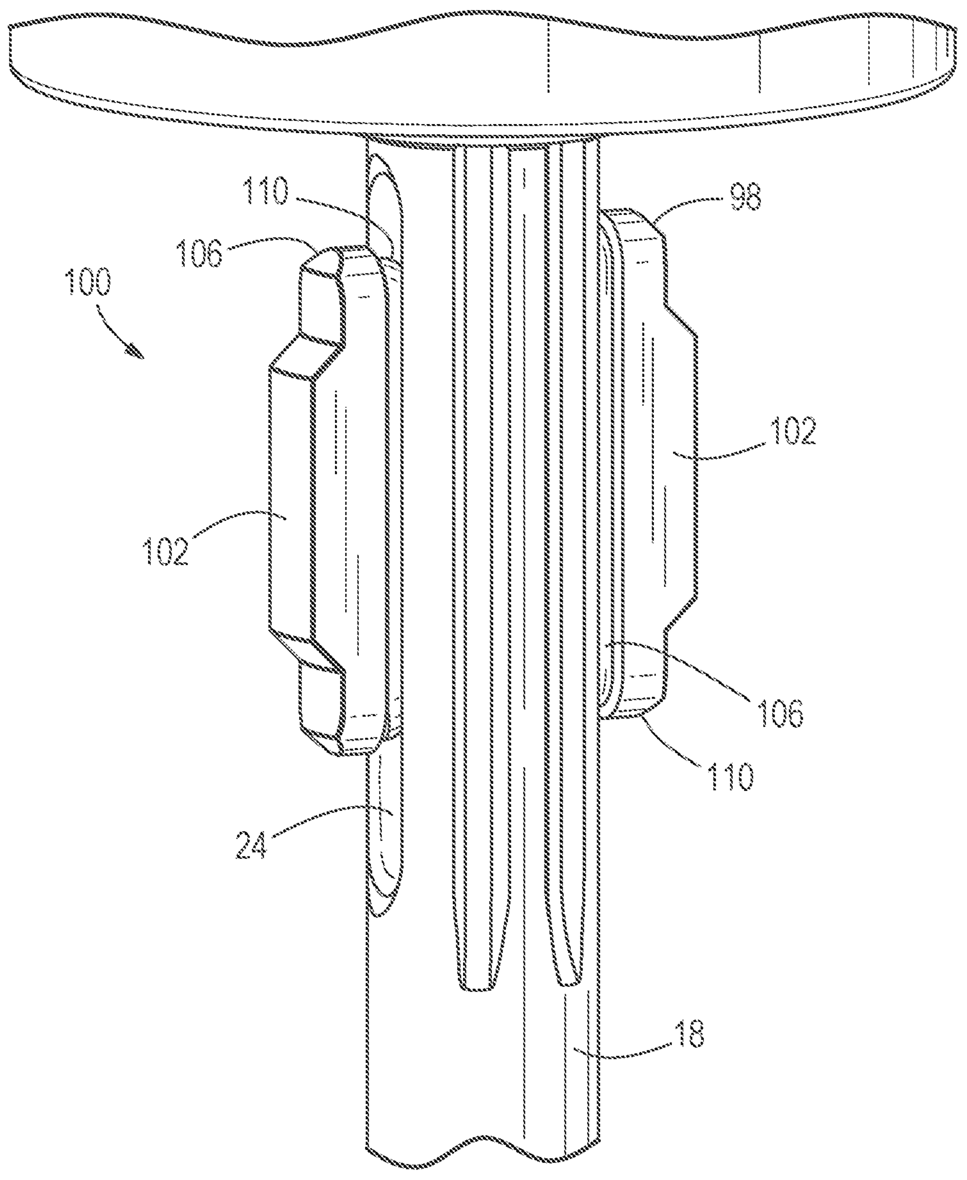
FIG. 8 is an enlarged perspective view of a post of the attachment of FIG. 1 within an output shaft of the powered hammer of FIG. 5, with the output shaft removed for clarity.

As shown in FIGS. 5, 7 and 8, the post 18 is received in an output shaft 98 of the powered hammer 12. The output shaft 98 includes a retention assembly 100 configured to secure the post 18 to the output shaft 98. Specifically, the retention assembly 100 includes one or more detents 102 positioned within longitudinal slots 106 in the output shaft 98. The detents 102 each have a radially inward-extending protrusion 110 that fits within the respective longitudinal grooves 24 in the post 18 to thereby permit limited axial movement of the post 18 relative to the output shaft 98, which has been removed in FIG. 8.

The powered hammer 12 includes a second motor 112 that is shown schematically in FIG. 5 and is configured to drive a second transmission 114, which in turn drives an axial impact mechanism 118. The axial impact mechanism 118 includes a reciprocating piston 122 disposed within the output shaft 98, a striker 126 that is selectively reciprocable within the output shaft 98 in response to an air spring developed by the reciprocating piston 122, and an anvil 130 that is impacted by the striker 126. In the illustrated embodiment, the first motor of the drive assembly 84 drives second gear 86 and the second motor 112 drives the axial impact mechanism 118. However, in other embodiments, the second motor 112 may drive the second gear 86 and the axial impact mechanism 118.

In operation, the operator first ensures that the post 18 of the attachment 10 is secured within the output shaft 98 of the powered hammer 12 by ensuring that the protrusions 110 of the securing members 102 are fit within the grooves 24 of the post 18. The operator then positions the rod 13 within the clamping portion 26 of the attachment 10 while the sliding block 38 is in the open position. The operator then activates the auxiliary motor unit 82, causing the first motor of the drive assembly 84 to rotate the second gear 86 in a first rotational direction. Rotation of the second gear 86 rotates the first gear 62 in a corresponding manner via the chain 88, which in turn causes the screw 50 to rotate. Rotation of the screw 50 causes the block 38 to slide within the recess 42 from the open position to the clamped position, thus causing the first jaw 32 to move towards the second jaw 34, clamping the rod 13 between the first and second jaws 32, 34 at a location coaxial with the second axis 30. The clamping force applied by the jaws 32, 34 is sufficiently high to prevent the jaws 32, 34 from slipping relative to the rod 12.

The operator then activates the second motor 112, which drives the second transmission 114 and thus the axial impact mechanism 118. Specifically, a variable pressure air pocket (or an air spring) is developed between the piston 122 and the striker 126 when the piston 122 reciprocates within the output shaft 98, whereby expansion and contraction of the air pocket induces reciprocation of the striker 126. The impact between the striker 126 and the anvil 130 is then transferred to the post 18, causing it to experience reciprocation within the output shaft 98. The reciprocation of post 18 is limited within the output shaft 98 by the length of the grooves 24. The repeated axial impacts delivered to the post 18 along the first axis 22 are transferred to the rod 13 along the second axis 30 via the body 14 of the attachment 10 and the clamping portion 26, in what will hereinafter be referred to as "an offset impact operation." Thus, during the offset impact operation, a portion of the length of the rod 13 is driven into the ground.

Once the rod 13 has been partially driven into the ground and the top end of the rod is closer to ground level, the operator discontinues the second motor 112. The operator then activates auxiliary motor unit 82, causing the first motor of the drive assembly 84 to rotate the second gear 86 in a second rotational direction that is opposite the first rotational direction. Rotation of the second gear 86 rotates the first gear 62 in a corresponding manner via the chain 88, which in turn causes the screw 50 to rotate. Rotation of the screw 50 causes the sliding block 38 to move within the recess 42 from the clamped position to the open position, thus causing the first jaw 32 to move away from the second jaw 34, allowing the rod 13 to be removed from the first and second jaws 32, 34.

The operator then positions the top end of the rod 13 into the bore 66 in the cylindrical protrusion 70. The operator then activates the second motor 112 again, which drives the second transmission 114 and thus the axial impact mechanism 118 in the same manner as described above. This time, in what will hereinafter be referred to as an "inline impact operation," the repeated axial impacts delivered to the post 18 along the first axis 22 are transferred to the rod 13 along the first axis 22, because the bore 66 is coaxial with the post 18. Thus, during the inline impact operation, the operator finishes driving the rod 13 into the ground.

Thus, at the beginning of a ground rod-driving operation, before the rod 13 has been partially inserted into the ground and the top end of the rod 13 is located high above (e.g., 6 to 10 feet) the ground, the operator does not have to lift and hold the powered hammer 12 at the top end of the rod 13. Rather, the operator can conveniently clamp the attachment 10 at the midsection of the rod 13 at ground level (e.g., 2 to 4 feet above the ground), via the clamping portion 26, and impact the rod 13 while holding the powered hammer 12 at a comfortable and stable operating height. The attachment 10 thus advantageously allows an operator to apply axial impacts upon the rod 13 at a location below the top end of the rod 13.

Figure 10:
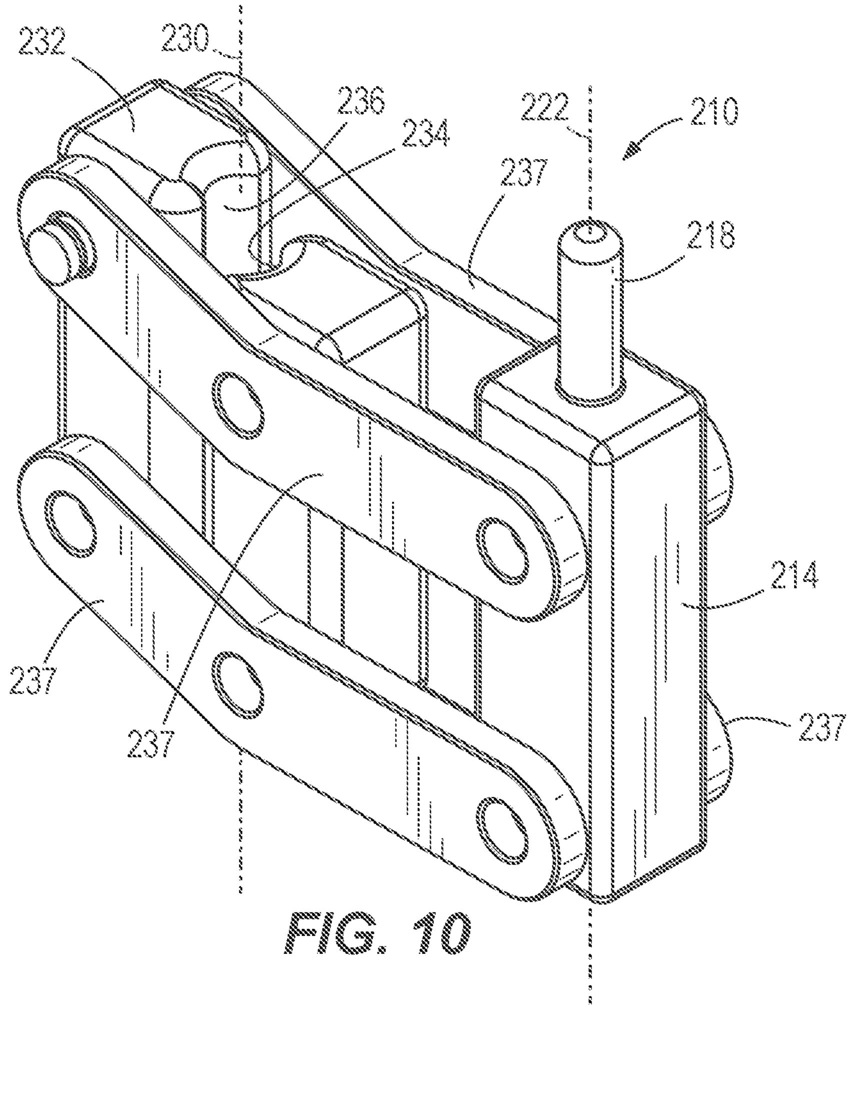
FIG. 10 is a perspective view of another embodiment of an attachment for use with the powered hammer of FIG. 5.

FIG. 10 illustrates another embodiment of an attachment 210 for use with the powered hammer 12. Like features are labeled with like reference numerals plus "200." The attachment 210 includes a body 214 having a post 218 extending therefrom. The attachment 210 includes jaws 232, 234 having respective clamping surfaces 236 in facing relationship with each other and engageable with a rod 13. The body 214 and jaws 232, 234 are interconnected by four identical and parallel links 237, each of which is pivotably coupled to each of the body 214, the jaw 232, and the jaw 234. A size of the gap or spacing between the jaws 232, 234 may be adjusted by pivoting the links 237 relative to the body 214, therefore providing adjustability for the attachment 10 to be used with different size rods 13. Also, because the jaws 232, 234 are elongated in the direction of the length of the rod 13, the jaws 232, 234 provide larger clamping surfaces 236 engageable with the rod 13, reducing marring or scratching of the rod 13 during a driving operation.

Figure 11:
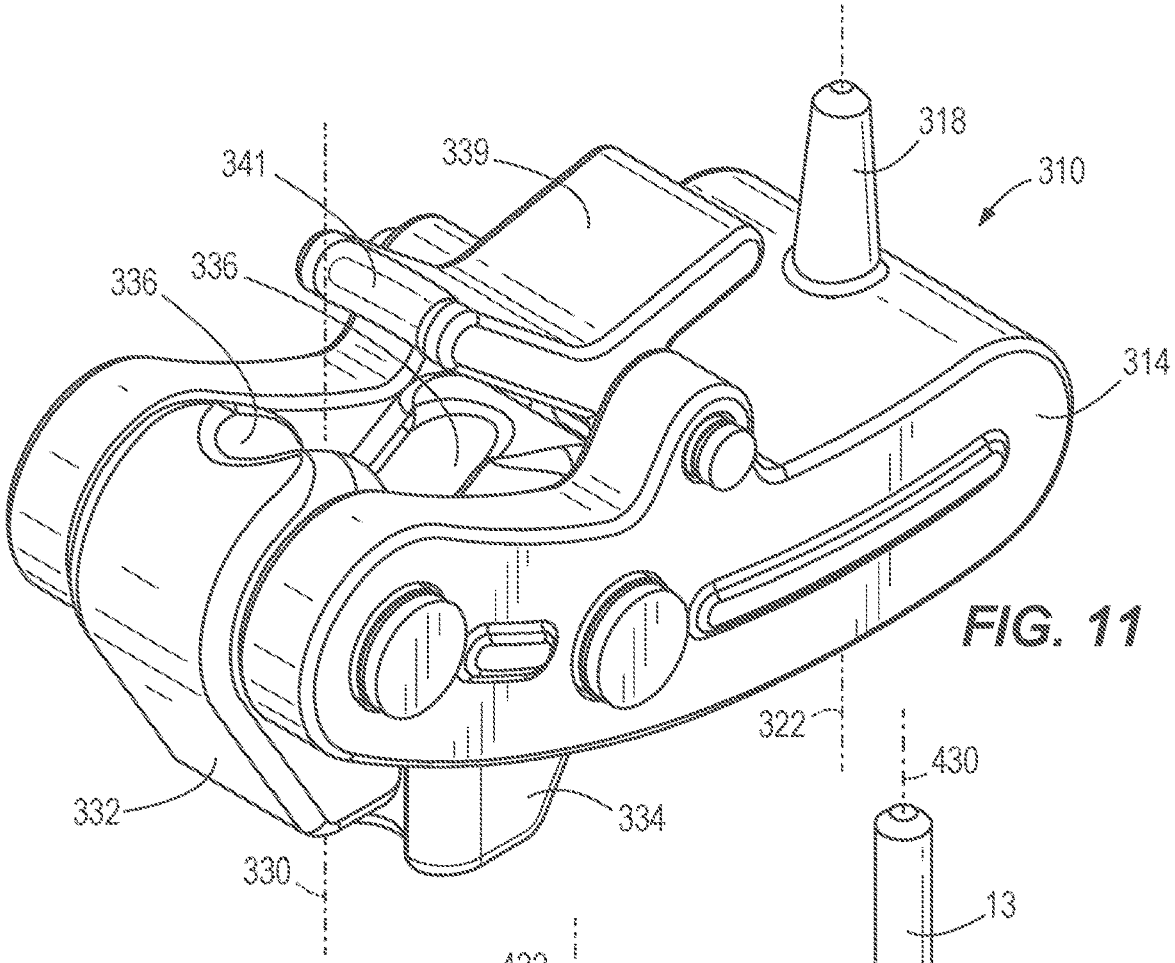
FIG. 11 is a perspective view of another embodiment of an attachment for use with the powered hammer of FIG. 5.

FIG. 11 illustrates another embodiment of an attachment 310 for use with the powered hammer 12. Like features are labeled with like reference numerals plus "300." The attachment 310 includes a body 314 having a post 318 extending therefrom. The attachment 310 includes jaws 332, 334 having respective clamping surfaces 336 in facing relationship with each other and engageable with a rod 13. Each of the jaws 332, 334 is pivotably coupled to the body 314 and biased toward a clamping or engaged position (i.e., a position in which the clamping surfaces 336 are biased into engagement with the rod 13). The attachment 310 also includes a lock 339 pivotably coupled to the body 314. The lock 339 includes an arcuate locking surface 341 engageable with the rod 13 when the rod 13 is positioned between the jaws 332, 334. The lock 339 is biased to a position (e.g., by a spring) in which the locking surface 341 is engaged with the rod 13. During operation of the powered hammer 12 with the attachment 310, following each axial impact delivered to the body 314 via the post 318, the lock 339 prevents the rod 13 from slipping relative to the jaws 332, 334. Furthermore, the post 318 is tapered to allow for vertical impacts to be delivered to the body 314 when the attachment 310 is used with different sizes of rods 13.

Figure 12:
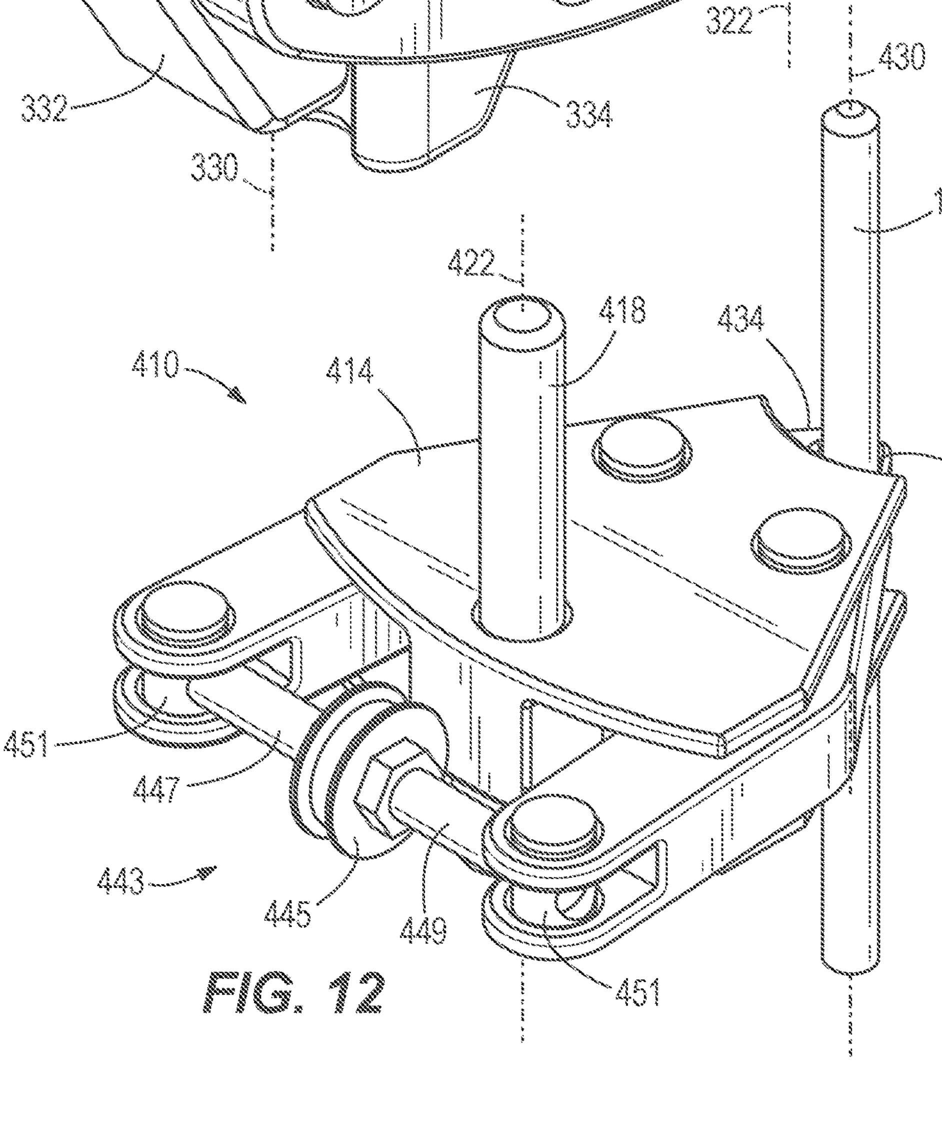
FIG. 12 is a perspective view of another embodiment of an attachment for use with the powered hammer of FIG. 5.

FIG. 12 illustrates another embodiment of an attachment 410 for use with the powered hammer 12. Like features are labeled with like reference numerals plus "400." The attachment 410 includes a body 414 having a post 418 extending therefrom. The attachment 410 includes jaws 432, 434 having respective clamping surfaces (not shown) in facing relationship with each other and engageable with a rod 13. Each of the jaws 432, 434 is pivotably coupled to the body 414 and includes a rear end pivotably coupled to an actuator assembly 443. The actuator assembly 443 includes a screw 445 having a right-handed threaded portion 447 on one side thereof and a left-handed threaded portion 449 on an opposite side. The threaded portions 447, 449 are threaded to barrel nuts 451 received in corresponding apertures in the jaws 432, 434. To open the attachment 410 for subsequent connection to a rod 13, the screw 445 is rotated in a first direction (e.g., counter-clockwise), thus, drawing the respective barrel nuts 451 closer toward the middle of the screw 451 and simultaneously pivoting the clamping surfaces of the jaws 432, 434 away from each other to increase a size of a gap therebetween for insertion of the rod 13. Then, the screw 451 is rotated the opposite direction, displacing the respective barrel nuts 451 farther from the middle of the screw 451 and simultaneously pivoting the clamping surfaces of the jaws 432, 434 toward each other to clamp onto the rod 13.

Figure 13:
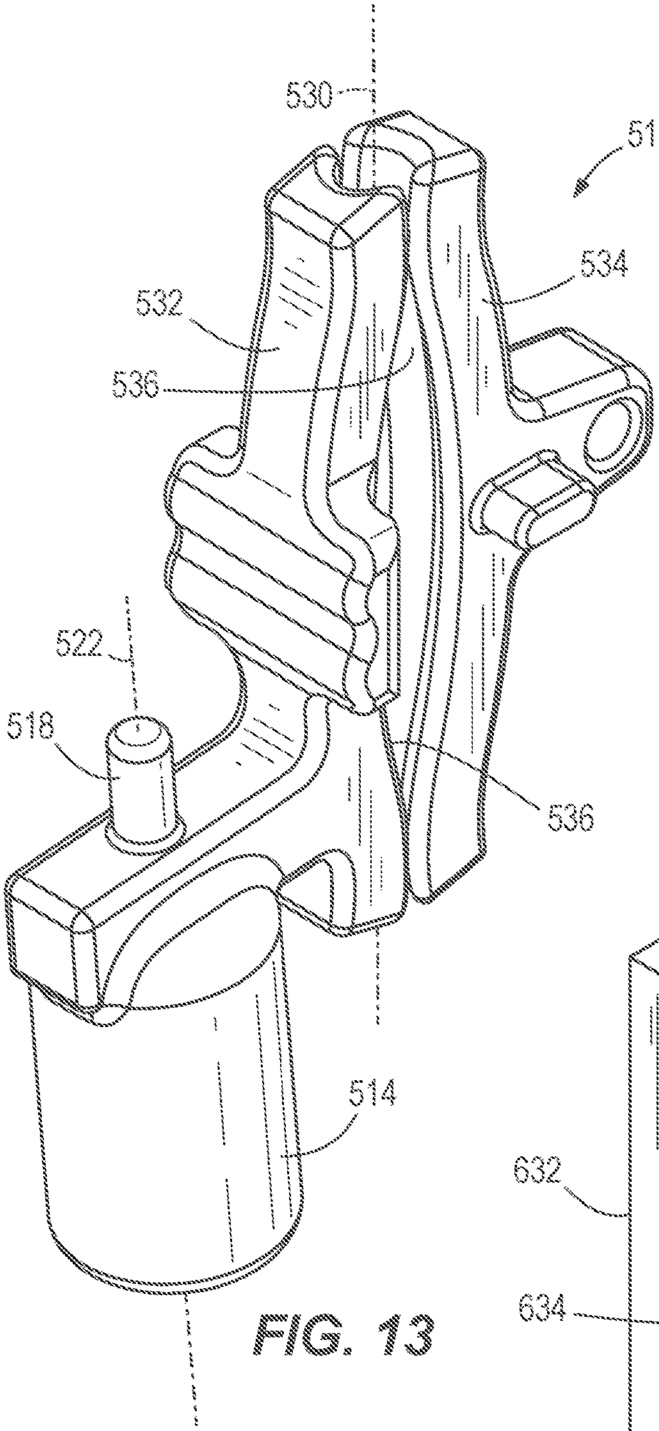
FIG. 13 is a perspective view of another embodiment of an attachment for use with the powered hammer of FIG. 5.

FIG. 13 illustrates another embodiment of an attachment 510 for use with the powered hammer 12. Like features are labeled with like reference numerals plus "500." The attachment 510 includes a body 514 having a post 518 extending therefrom. The attachment 510 includes jaws 532, 534 having respective clamping surfaces 536 in facing relationship with each other and engageable with a rod 13. The jaw 532 is integrally formed with the body 514 as a single piece. Although not shown, the attachment 510 includes an over-center latch mechanism for applying a clamping force to the jaws 532, 534. Each of the jaws 532, 534 is elongated in the direction of the length of the rod 13 and includes a bowed shape. The jaws 532, 534 are also flexible, permitting them to at least partially straighten during application of a clamping force by the over-center latch mechanism to increase the area of the clamping surfaces 536 in contact with the rod 13. Because the jaws 532, 534 are flexible, they act as springs. If the rod 13 deforms during a driving operation, the jaws 532, 534 tend to absorb the deformation and maintain most of the clamping surfaces of the jaws 532, 534 in contact with the rod 13.

Figure 14:
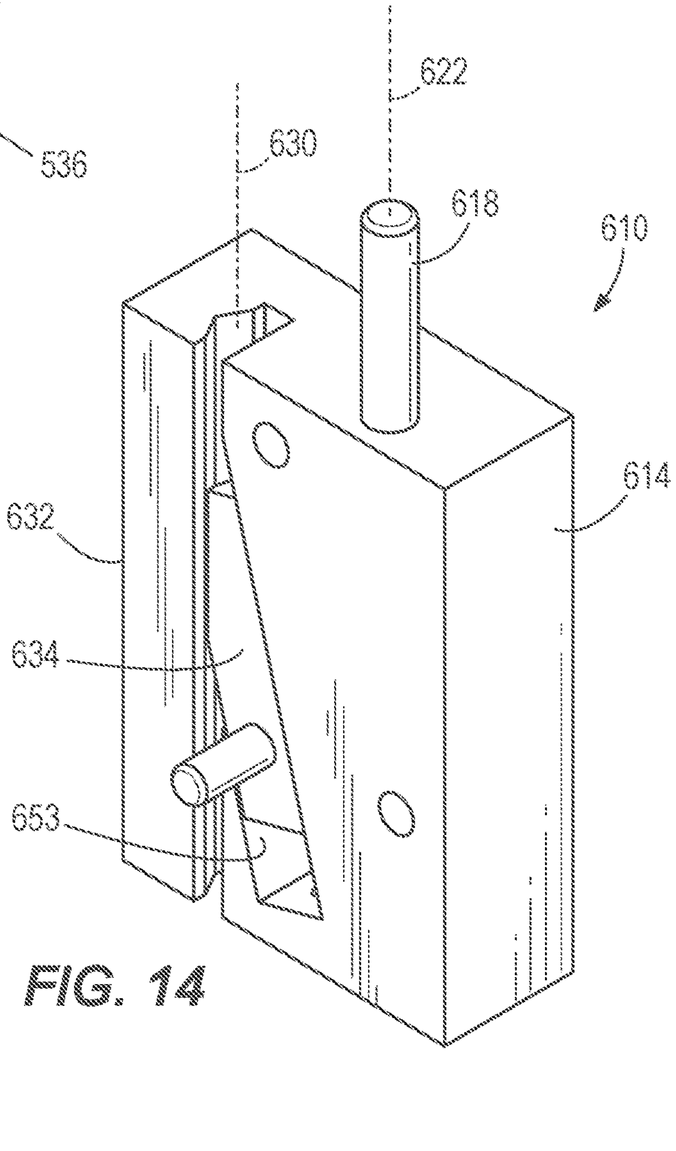
FIG. 14 is a perspective view of another embodiment of an attachment for use with the powered hammer of FIG. 5.

FIG. 14 illustrates another embodiment of an attachment 610 for use with the powered hammer 12. Like features are labeled with like reference numerals plus "600." The attachment 610 includes a body 614 having a post 618 extending therefrom. The attachment 610 includes jaws 632, 634 having respective clamping surfaces 636 in facing relationship with each other and engageable with a rod 13. The jaw 632 is integrally formed with the body 614 as a single piece, whereas the jaw 634 is positioned and slideable within a slot 653 that is obliquely oriented relative to the clamping surface 636 of the jaw 632 and the second axis 630. Accordingly, the jaws 632, 634 converge toward the end of the body 614 having the post 618, creating a greater clamping force when the body 614 is impacted and permitting easy release when detaching the attachment 610 from the rod 13. Although not shown, a spring may bias the jaw 634 toward the jaw 632. The wedge created by the jaws 632, 634 is configured such that the coefficient of friction between the clamping surface of the jaw 634 and the rod 13 is greater than the coefficient of friction of the jaw 634 and the surface of the body 614. Thus, when the body 614 is impacted, the jaw 634 tends to stay in contact with and grip the rod 13.

Figure 15:
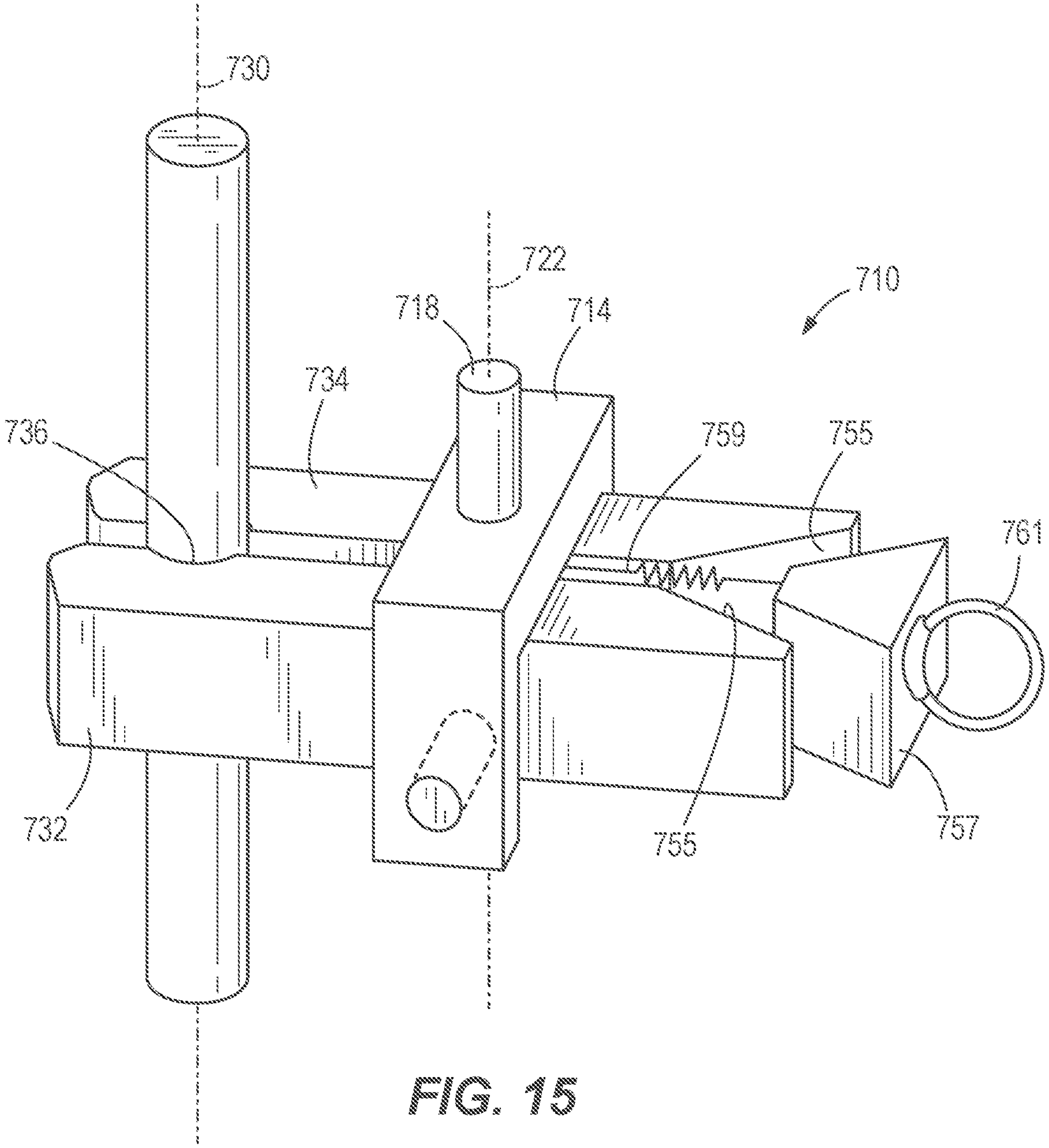
FIG. 15 is a perspective view of another embodiment of an attachment for use with the powered hammer of FIG. 5.

FIG. 15 illustrates another embodiment of an attachment 710 for use with the powered hammer 12. Like features are labeled with like reference numerals plus "700." The attachment 710 includes a body 714 having a post 718 extending therefrom. The attachment 710 includes jaws 732, 734 having respective clamping surfaces 736 in facing relationship with each other and engageable with a rod 13. Each of the jaws 732, 734 is pivotably coupled to the body 714 and includes a rear end having an inclined surface 755. The attachment 710 also includes a wedge 757 engaged with the inclined surfaces 755 of the respective jaws 732, 734 and a spring 759 biasing the wedge 757 toward the body 714. The wedge 757 includes a pull ring 761 that is graspable by the user of the attachment 710 to move the wedge 757 away from the body 714 against the bias of the spring 759. To open the attachment 710 for subsequent connection to a rod 13, the wedge 757 is pulled away from the body 714 to disengage from the inclined surfaces 755, thereby permitting the jaws 732, 734 to be pivoted away from each other to create a sufficient gap for insertion of the rod 13. Then, the wedge 757 is released, permitting the spring 759 to rebound and pull the wedge 757 toward the body 714. As the wedge 757 slides along the inclined surfaces 755 of the respective jaws 732, 734, the rear ends of the respective jaws 732, 734 are spread apart, thus simultaneously pivoting the clamping surfaces of the jaws 732, 734 toward each other to clamp onto the rod 13. Thus, in a neutral state of the attachment 710, the jaws 732, 734 are biased toward a clamping position in which the clamping surfaces are biased into engagement with the rod 13.

Figure 16:
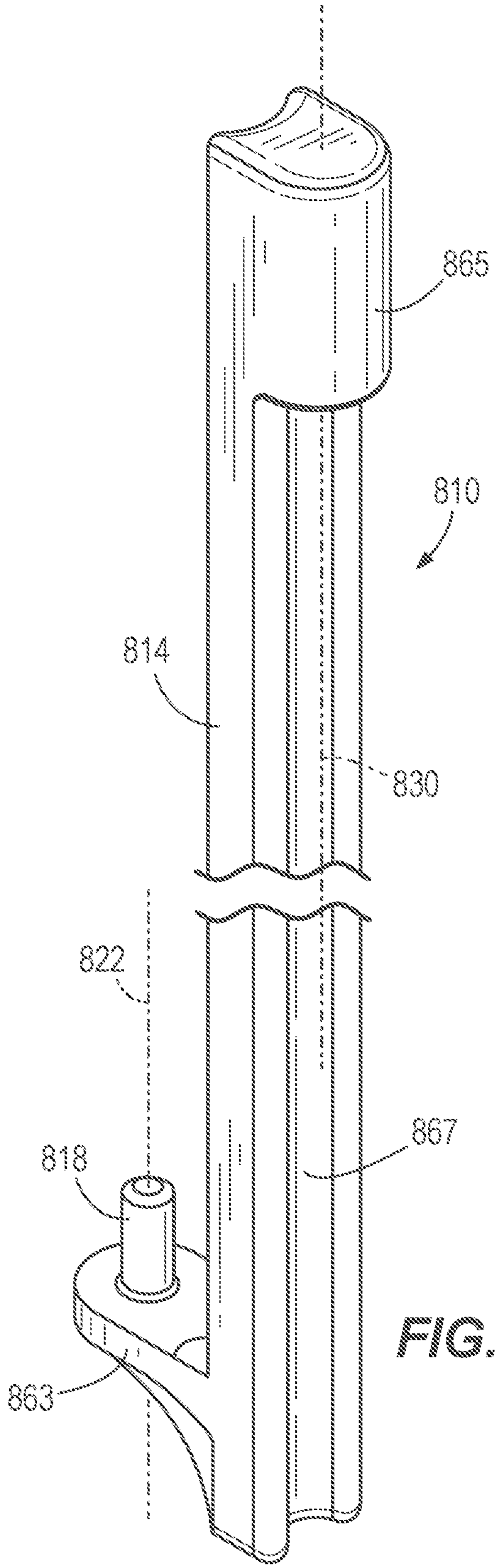
FIG. 16 is a perspective view of another embodiment of an attachment for use with the powered hammer of FIG. 5.

FIG. 16 illustrates another embodiment of an attachment 810 for use with the powered hammer 12. Like features are labeled with like reference numerals plus "800." The attachment 810 includes an elongated body 814, a perch 863 laterally extending from one side of the body 814, and an anvil 865 laterally extending from the other side of the body 814, at the opposite end of the body 814 as the perch 863. The attachment 810 also includes a post 818 extending from the perch 863 in a direction parallel with the body 814. In the embodiment of FIG. 16, the receiving portion that defines the second axis 830 is a longitudinal groove 867 defined in the body 814, in which a rod 13 is receivable. The anvil 865 is intersected by the second axis 830, such that the top end of the rod 13 is in contact with the anvil 865 when received in the longitudinal groove 867. The body 814 may comprise a single piece or multiple interconnected pieces to allow the length of the attachment 810 to be adjusted. Padding may be used in the groove 867 to reduce marring of the rod 13. Furthermore, the attachment 810 could alternatively be incorporated as part of the powered hammer 12 instead of being a separate component.

Figure 17:
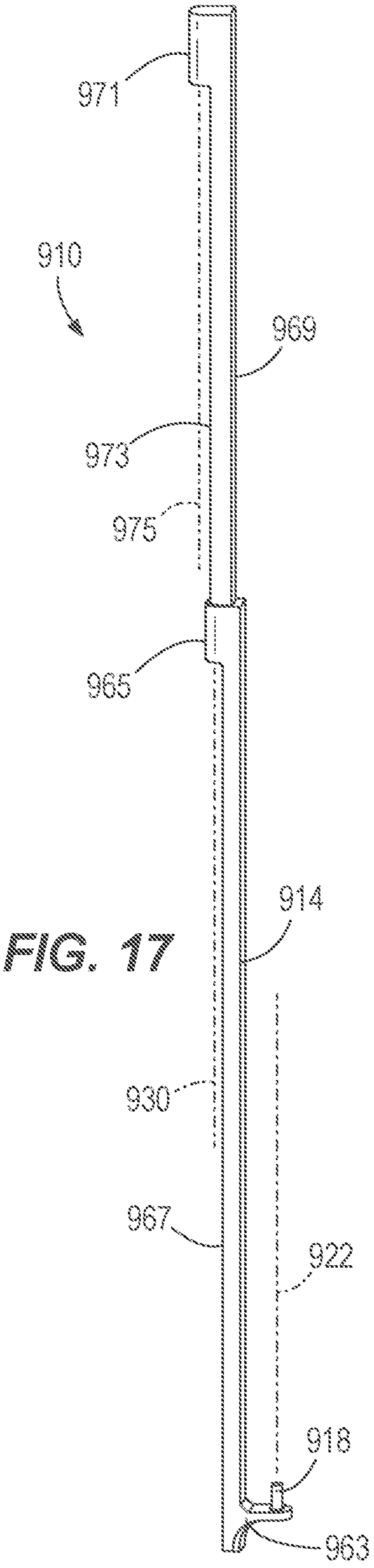
FIG. 17 is a perspective view of another embodiment of an attachment for use with the powered hammer of FIG. 5.

FIG. 17 illustrates another embodiment of an attachment 910 for use with the powered hammer 12. Like features are labeled with like reference numerals plus "900." The attachment 910 is substantially identical to the attachment 810, except the longitudinal groove 967 is a first longitudinal groove 967 defining first receiving portion and the anvil 965 is a first-tier anvil. The attachment 810 includes a second-tier body 969 secured to the first-tier body 914, with the second-tier body including a second longitudinal groove 973 defining a second receiving portion for the rod 13 and a third axis 975 that is parallel to the first and second axes 922, 930. A second-tier anvil 971 laterally extends from the second-tier body 969 in the same direction that the anvil 965 extends from the first-tier body 914. The second-tier anvil 971 is arranged above the second longitudinal groove 973, such that the second-tier anvil 971 is intersected by the third axis 975 and the top end of the rod 13 is in contact with the second-tier anvil 971 when received in the second longitudinal groove 973. Accordingly, the lateral positions of the respective anvils 965, 971 are staggered to permit either of the anvils to be used 965, 971 for driving a rod 13. Specifically, the anvil 971 may be used when the top end of the rod 13 is higher from the ground, and the anvil 965 may be used when the top end of the rod 13 is closer to the ground.

Figure 18:
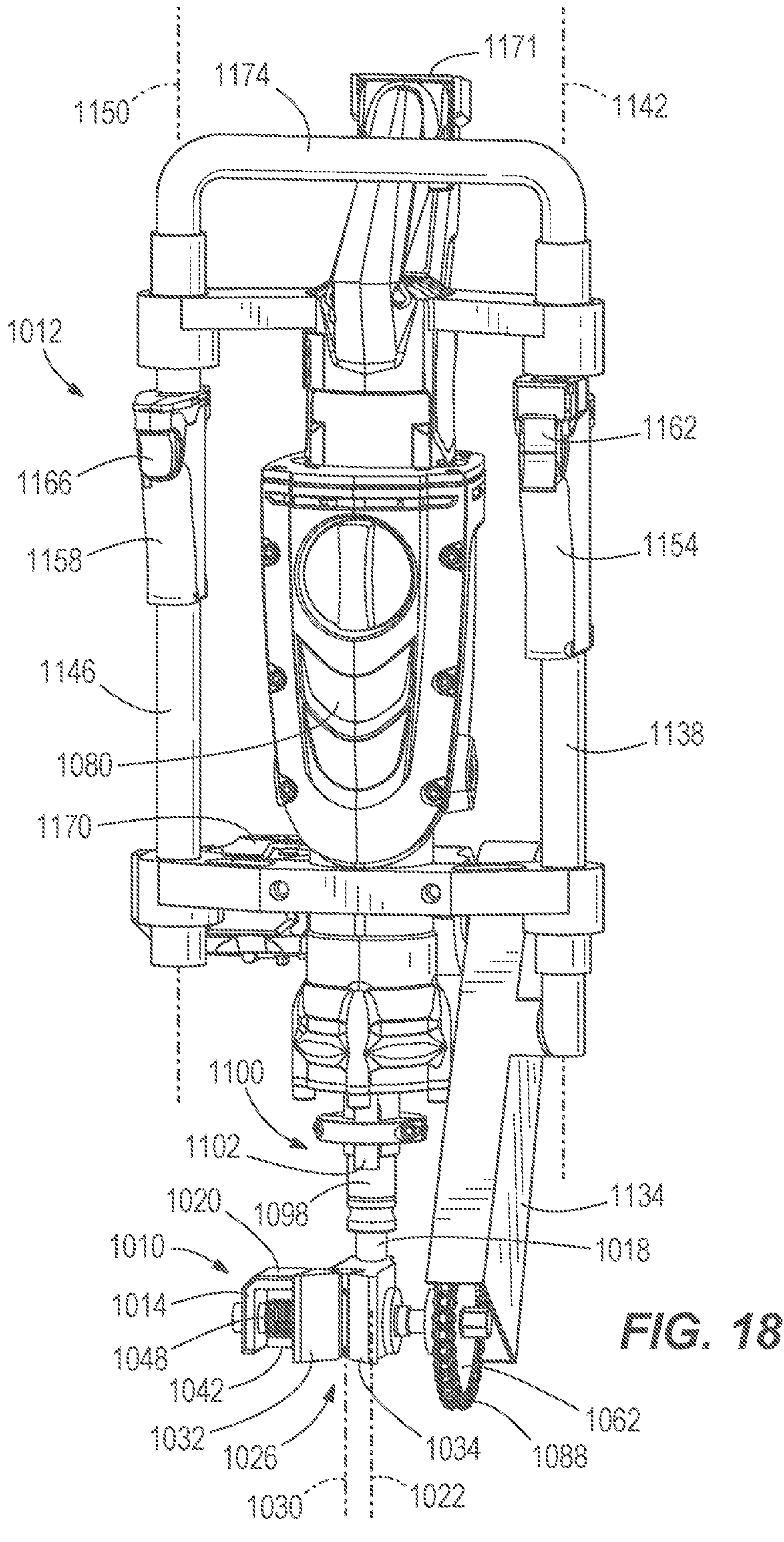
FIG. 18 is a perspective view of another embodiment of a powered hammer for use with an attachment.
Figure 19:
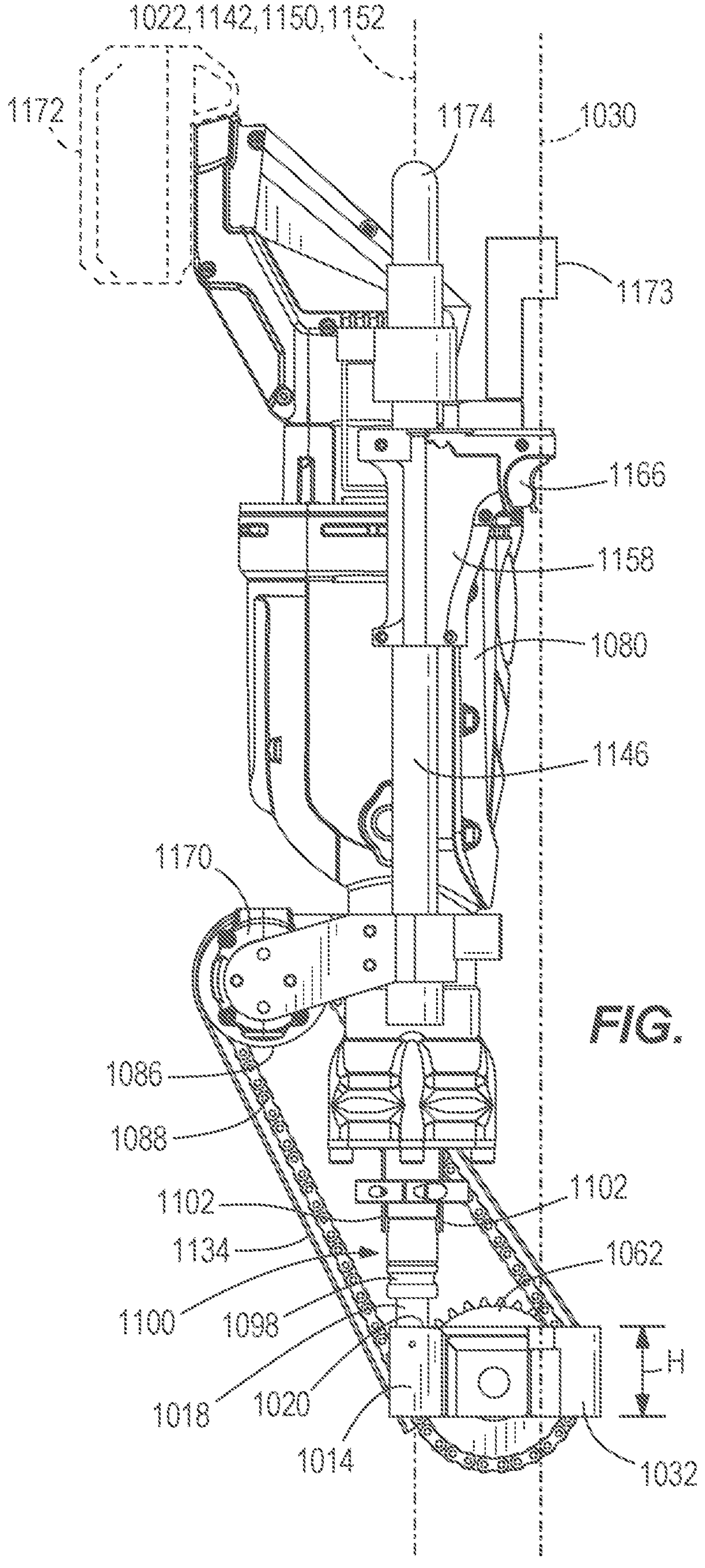
FIG. 19 is a plan view of the powered hammer and attachment of FIG. 18.
Figure 20:
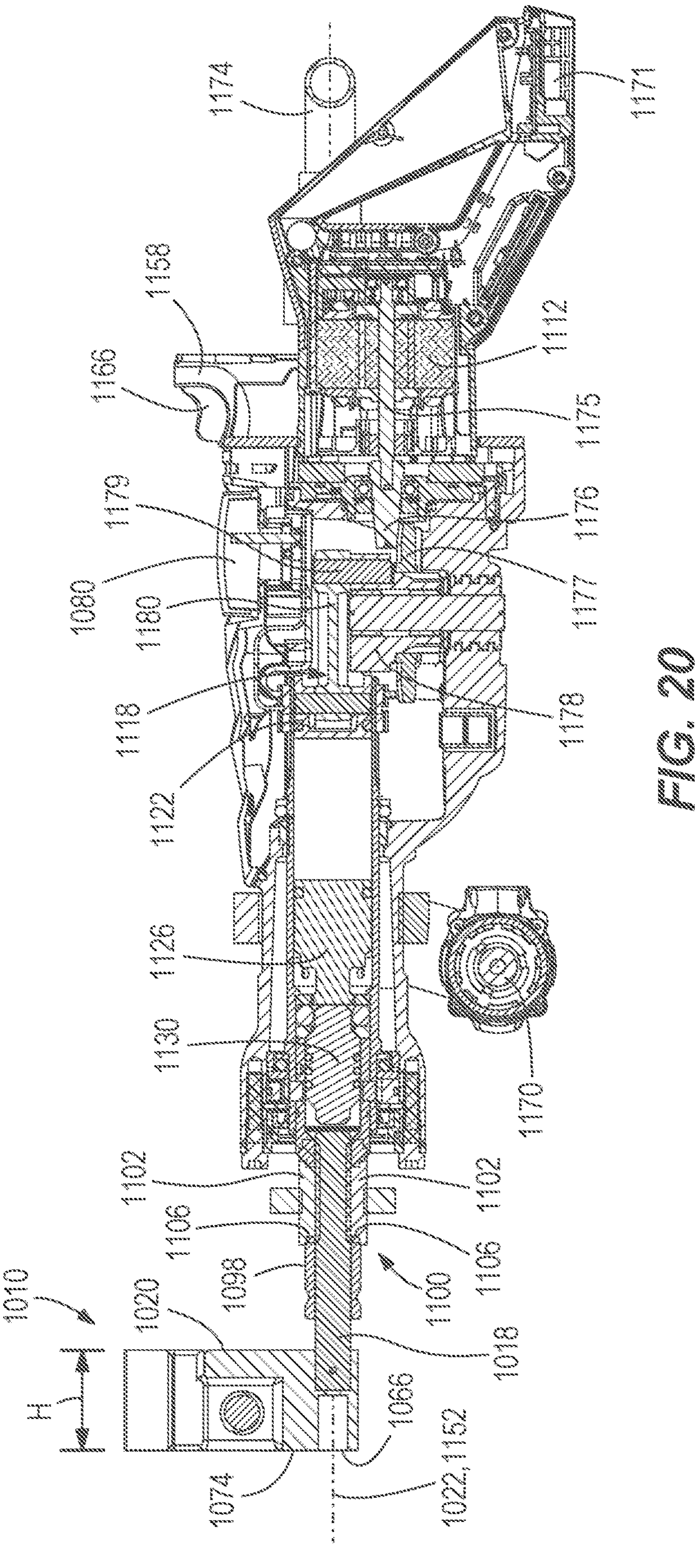
FIG. 20 is a cross-sectional view of the powered hammer and attachment of FIG. 18.

FIGS. 18-20 illustrate another embodiment of a powered hammer 1012 usable with an attachment 1010 to drive a rod 1013 into the ground. Like features are labeled with like reference numerals plus "1000." The attachment 1010 and powered hammer 1012 are respectively substantially identical to the attachment 10 and powered hammer 12, with the following differences and additions explained below. As shown in FIGS. 18 and 19, the powered hammer 1012 includes a guard 1134 arranged over the first and second gears 1062, 1086 and the chain 1088. In some embodiments, the first and second gears 1062, 1086 can be sprocket gears interconnected by the chain 1088.

Figure 21:
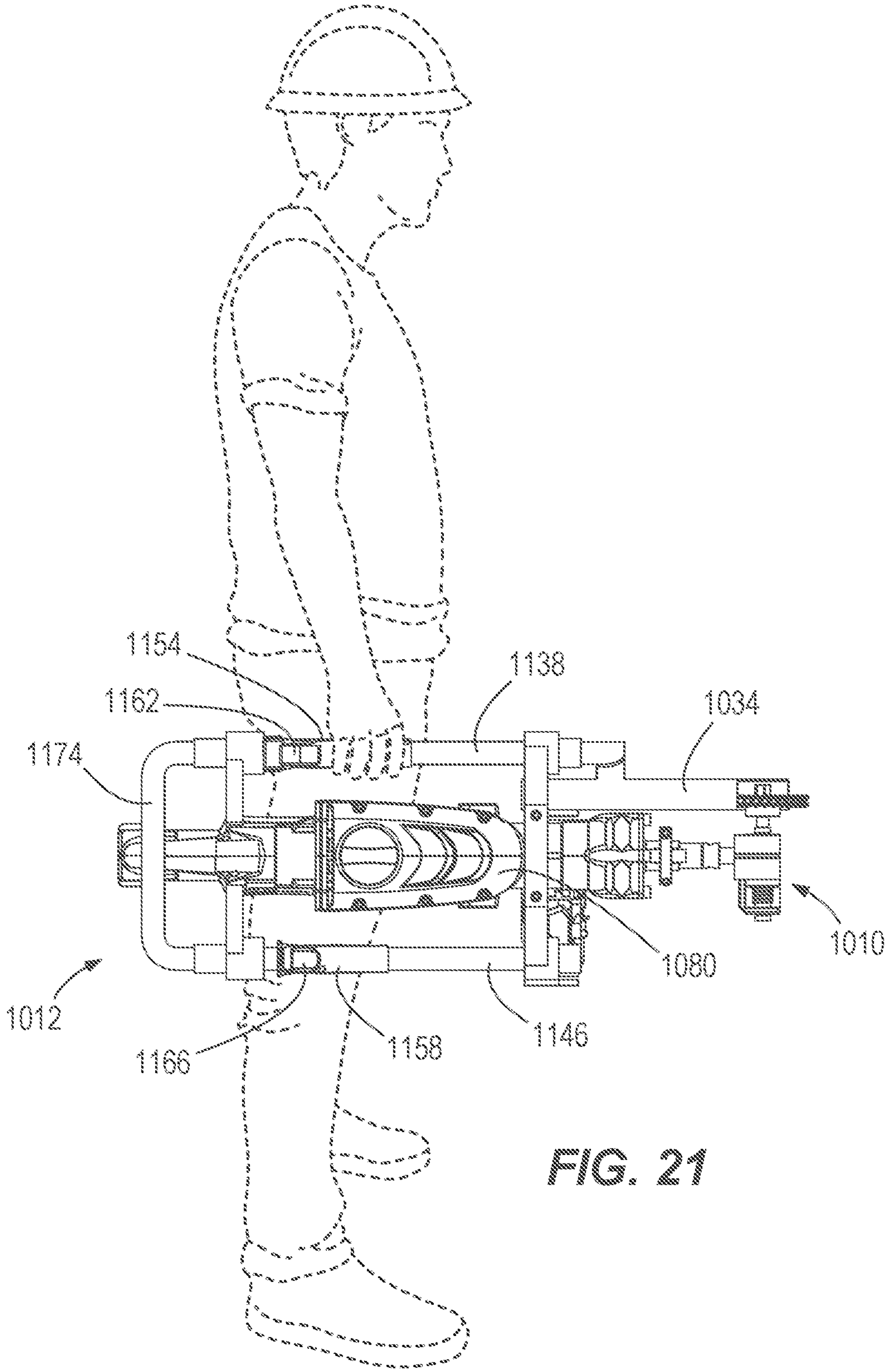
FIG. 21 is a plan view of an operator carrying the powered hammer and attachment of FIG. 18 in a carrying configuration.

As shown in FIG. 18, the powered hammer 1012 includes a first post 1138 defining a first post axis 1142 and a second post 1146 defining a second post axis 1150. The first and second post axes 1142, 1150 are parallel to the first axis 1022 and the second axis 1030. Additionally, as shown in FIG. 19, the first and second post axes 1142, 1150 are arranged on a plane 1152 that also includes the first axis 1022. In other embodiments, the first axis 1022 is parallel to the first and second post axes 1142, 1150, but does not lie on the plane 1152 on which the first and second post axes 1142, 1150 are arranged. A first handle 1154 is arranged on the first post 1138 and a second handle 1158 is arranged on the second post 1146. The first and second handles 1154, 1158 are respectively moveably adjustable along the first and second posts 1138, 1146 to accommodate operators of different heights. The first or second handles 1154, 1158, or first and second posts 1138, 1146, permit an operator to carry the powered hammer 1012 in a horizontal orientation in a carrying configuration on a job site, as shown in FIG. 21.

In the embodiment illustrated in FIGS. 18-20, a first actuator 1162 is on the first handle 1154 and a second actuator 1166 is on the second handle 1158. The first actuator 1162 is configured to activate a first motor 1170 of the drive assembly 1084 that drives the second gear 1086. In the illustrated embodiment, the first actuator 1162 is a rocker switch, such that movement of the rocker switch in a first direction is configured to cause rotation of the second gear 1086 in a first rotational direction to thereby clamp the first and second jaws 1032, 1034. Movement of the rocker switch in a second direction that is opposite the first direction is configured to cause rotation of the second gear 1086 in a second rotational direction that is opposite the first rotational direction, to thereby unclamp first and second jaws 1032, 1034. The second actuator 1166 is configured to activate the second motor 1112 that drives the axial impact mechanism 1118.

As shown in FIG. 20, a drive shaft 1175 extends from the second motor 1112 to drive a bevel gear 1176 of the second transmission 1114. The second transmission 1114 also includes a crank gear 1177 configured to be driven by the bevel gear 1176 and configured to drive a crank shaft 1178 having an eccentric pin 1179. The eccentric pin 1179 is connected to the reciprocating piston 1122 by a connecting rod 1180, such that the second transmission 1114 can transmit torque from the second motor 1112 into a reciprocating motion of the piston 1222.

When the first actuator 1162 is actuating the first motor 1170, the second actuator 1166 is electronically locked out or disabled, such that actuation of the second actuator 1166 will not activate the second motor 1112 while the first actuator 1162 is actuated. When the second actuator 1166 is activating the second motor 1112, the first actuator 1162 is electronically locked out or disabled, such that actuation of the first actuator 1162 will not activate the first motor 1170 while the second actuator 1166 is actuated. Thus, the first and second motors 1170, 1112 are prevented from simultaneously driving the impact mechanism 1118 and second gears 1086 at the same time.

Figure 22:
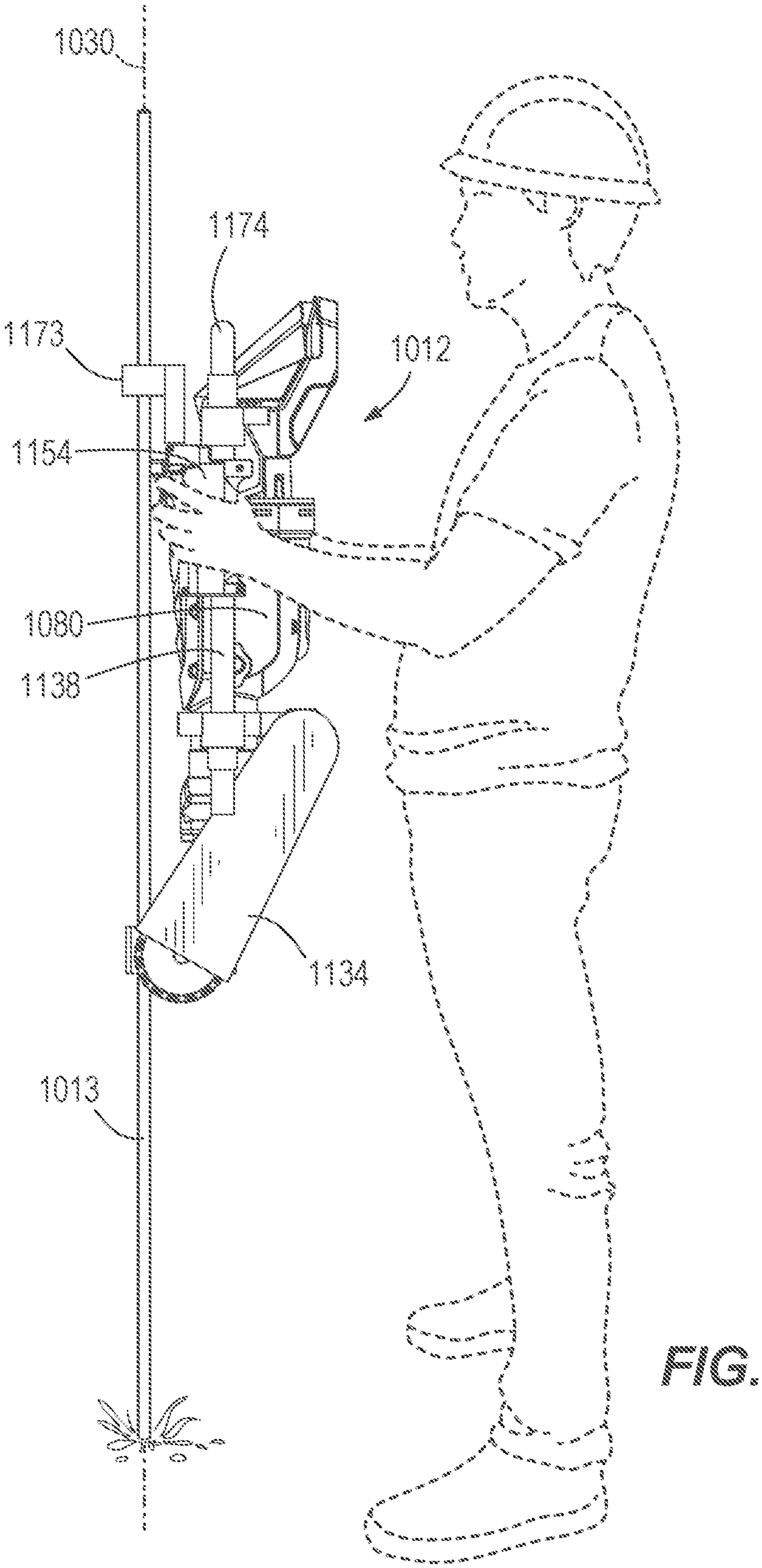
FIG. 22 is a plan view of an operator operating the powered hammer and attachment of FIG. 18 to drive a rod into a ground in an offset impact operation.

By providing the first and second actuators 1162, 1166 on the first and second handles 1154, 1158, respectively, it is convenient for an operator to alternatively clamp or unclamp the rod 1013 with the attachment 1010, and activate and deactivate the impact mechanism 1118, during the offset impact operation in which the operator is grasping both handles 1154, 1158 and the force is applied to a midpoint of the rod 1013 between two ends of the rod 1013, as shown in FIG. 22. In other embodiments, both the first and second actuators 1162, 1166 are both on a single handle, such as the first or second handle 1154, 1158.

As shown in FIGS. 18 and 20, the powered hammer 1012 includes a battery receptacle 1171 to receive a battery 1172 (FIG. 19) to provide power to the first and second motors 1170, 1112. As shown in FIGS. 19 and 22, in some embodiments, the powered hammer 1012 includes an alignment member 1173 that has an aperture aligned with the second axis 1030. The alignment member 1173 is thus configured to receive and radially constrain a portion of the rod 1013 that is above the attachment 1010 during an offset impact operation, as shown in FIG. 22, to prevent the portion of the rod 1013 above the attachment 1010 from wobbling during the operation, while allowing the rod 1013 to move axially therethrough.

Figure 23:
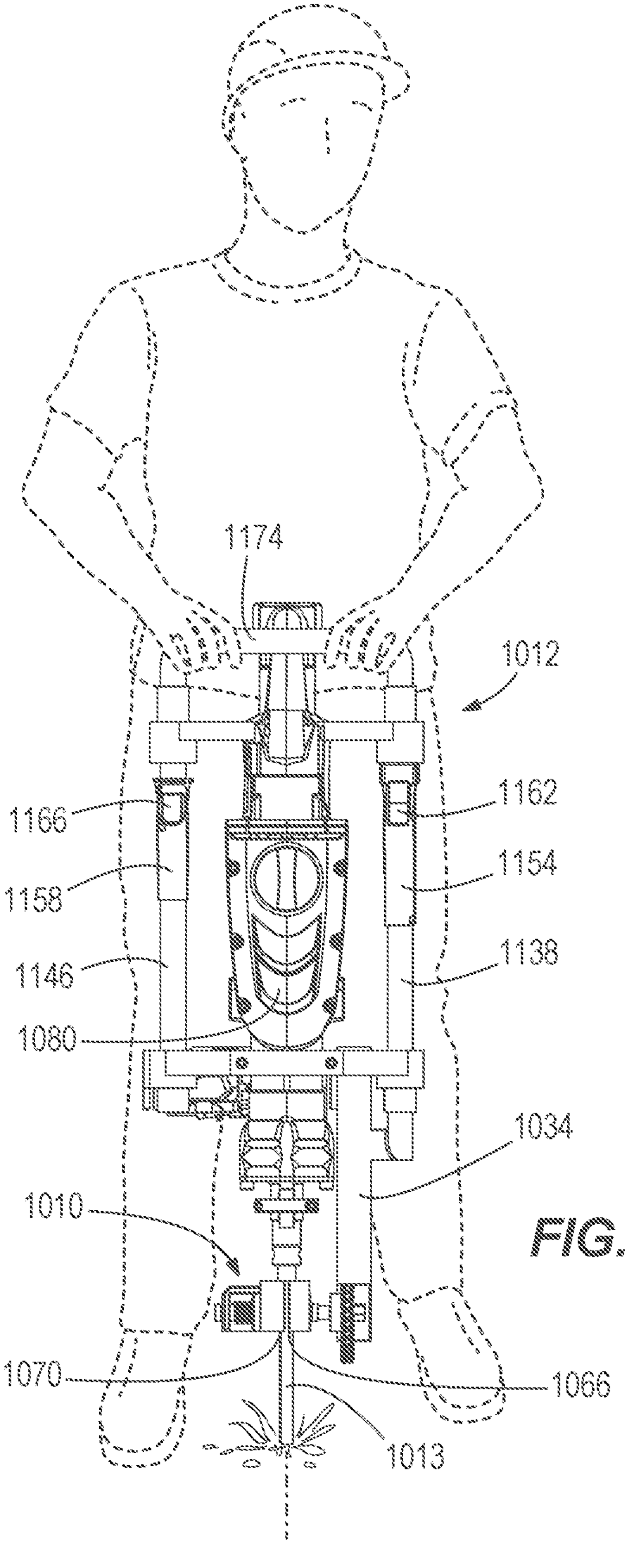
FIG. 23 is a plan view of an operator operating the powered hammer and attachment of FIG. 18 to drive a rod into a ground in an inline impact operation.

As shown in FIGS. 18-20, the powered hammer 1012 includes a top handle 1174 that extends in a direction perpendicular to the first and second post axes 1142, 1150. Thus, as described above, after an operator has finished the offset impact operation shown in FIG. 22, and the rod 1013 has almost been completely driven into the ground, the operator positions the top end of the rod 1013 into a bore 1066 in the attachment 1010. Then, while holding the top handle 1174 as shown in FIG. 23, the operator activates the second motor 1112 again, which activates the axial impact mechanism 1118, such that impacts to the post 1018 along the first axis 1022 are transferred to the rod 1013 along the first axis 1022, because the bore 1066 is coaxial with the post 1018. In the inline impact operation of FIG. 23 wherein the attachment 1010 is effectively bypassed, the operator can use the top handle 1174 to apply a downward force to finish driving the rod 1013 into the ground.

In some embodiments, the powered hammer 1012 includes a vibration damping system to limit vibration transmitted to the operator during operation. In some embodiments, a first spring is included in one of the first post 1138 or the first handle 1154 and a second spring is included in one of the second post 1146 or the second handle 1158. Thus, as an operator grips the first and second handles 1154, 1158 during a offset impact operation, as shown in FIG. 22, or grips the top handle 1174 during an inline impact operation, as shown in FIG. 23, the impact force translated through the first and second posts 1138, 1146 along the first and second post axes 1142, 1150 is respectively absorbed and released by the first and second springs, thereby attenuating vibration to the operator.

In some embodiments, the vibration damping system includes a first viscous damper along with the first spring in one of the first post 1138 or first handle 1154, and a second viscous damper along with the second spring in one of the second post 1146 or second handle 1158. Thus, as an operator grips the first and second handles 1154, 1158 during a offset impact operation, as shown in FIG. 22, or grips the top handle 1174 during an inline impact operation, as shown in FIG. 23, the impact force translated through the first and second posts 1138, 1146 along the first and second post axes 1142, 1150 is respectively absorbed and released by the first and second springs, and also dissipated by the first and second viscous dampers, thereby attenuating vibration to the operator.

Figure 24:
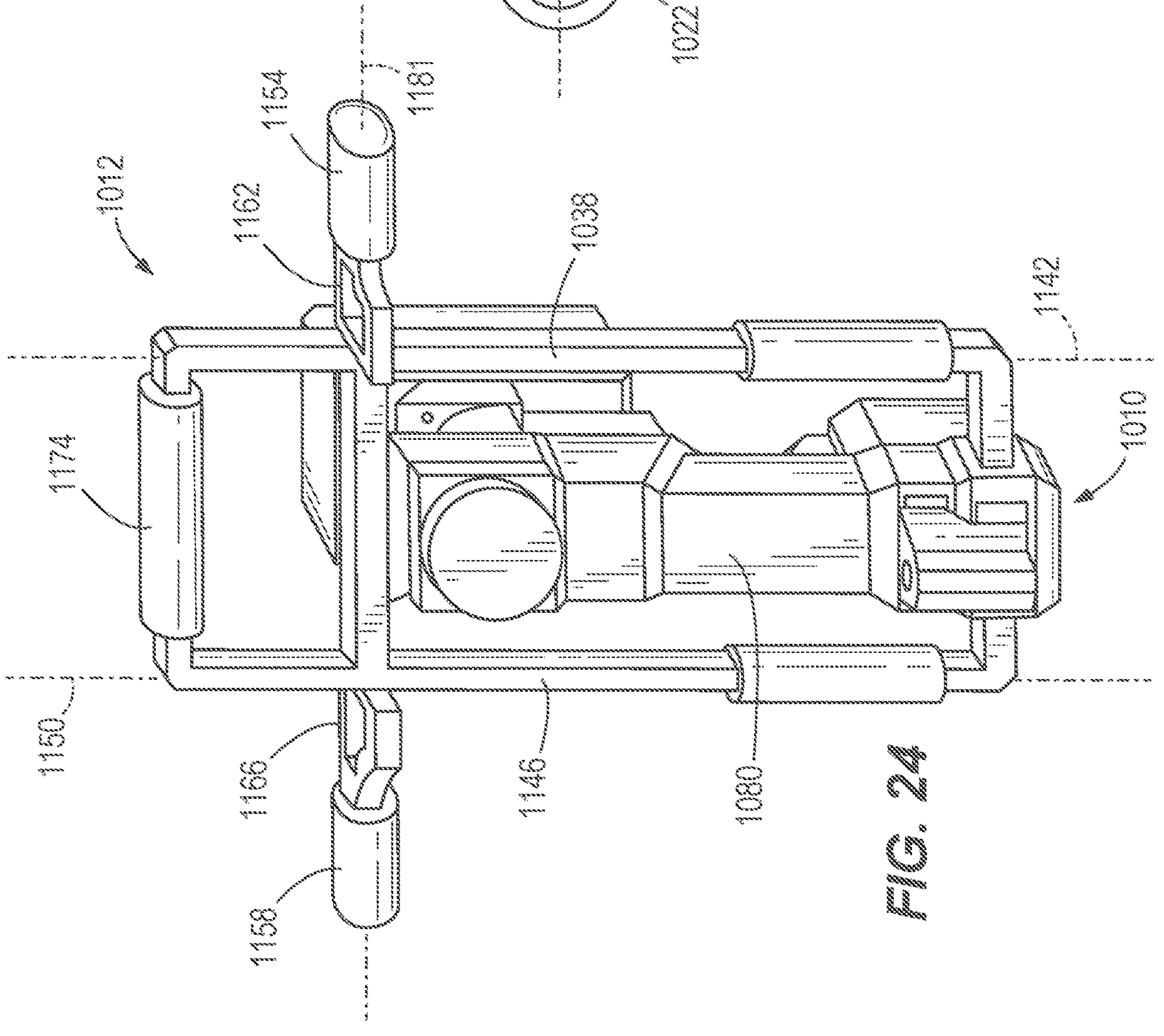
FIG. 24 is a perspective view of a powered hammer with an attachment according to another embodiment of the invention.

As shown in FIG. 24, in some embodiments of powered hammer 1012, the first and second handles 1154, 1158 are coupled for movement together along the first and second posts 1138, 1146. In the embodiment of FIG. 24, the first and second handles 1154, 1158 extend along a handle axis 1181 that is perpendicular to the first and second post axes 1142, 1150, thus allowing the operator to use the first and second handles 1154, 1158 to apply a downward force during an inline impact operation.

Figure 25:
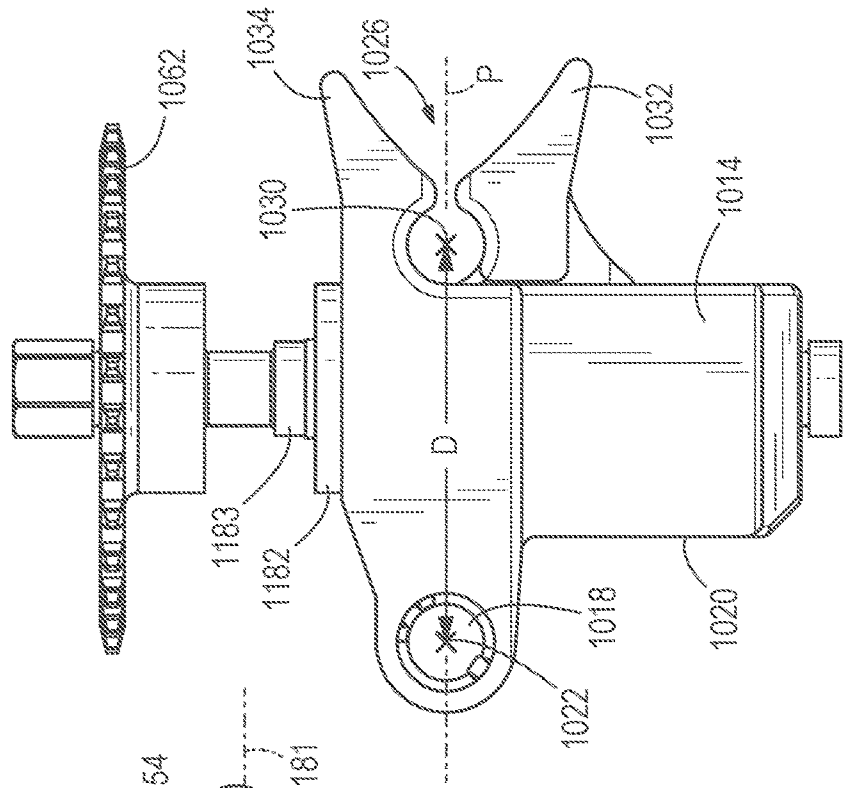
FIG. 25 is a plan view of the attachment of FIG. 18.

As shown in FIG. 25, in some embodiments, the attachment 1010 includes a bronze bushing 1182 and a plurality of Belleville washers 1183 between the first gear 1062 and the body 1014 of the attachment 1010. There is a distance D between the first and second axes 1022, 1030 and in some embodiments the distance D is 3.5 inches. In some embodiments, the post 1018 is an SDS-Max shank. In some embodiments, the post 1018 is press-fit and welded to the body 1014. In some embodiments, the screw 1050 is an ACME screw. In some embodiments, the first and second jaws 1032, 1034 can exert a clamping force on rod 1013 of 10,000 lbs and can receive an input torque of 1,183 inch-pounds. In other embodiments, the clamping force and torque could respectively be higher or lower. As shown in FIGS. 19 and 20, the first and second jaws 1032, 1034 have a height H and in some embodiments, the height H can be varied to optimize rod retention relative to the clamping force applied by the first and second jaws 1032, 1034. In some embodiments, the powered hammer 1012 includes an interface screen configured to display data related to the hammering operation.

Various features of the invention are set forth in the following claims.

What is claimed is:

1. A method of driving a rod into the ground, the method comprising:

coupling an impact portion of an attachment to a powered hammer, the powered hammer including a first handle, a second handle, and a set of actuators coupled to at least one of the first handle and the second handle;

positioning the rod between a first jaw of the attachment and a second jaw of the attachment;

activating a first motor via the set of actuators to move the first jaw toward the second jaw, such that the rod is clamped between the first and second jaws; and activating a second motor via the set of actuators to drive an axial impact mechanism of the powered hammer to deliver repeated axial impacts to the impact portion of the attachment.

2. The method of claim 1, wherein the step of activating the first motor to move the first jaw toward the second jaw comprises actuating a first actuator of the set of actuators that is supported on the first handle.

3. The method of claim 2, wherein the step of activating the second motor to drive the axial impact mechanism of the powered hammer to deliver repeated axial impacts to the impact portion of the attachment comprises actuating a second actuator of the set of actuators that is supported on the second handle.

4. The method of claim 3, further comprising electronically disabling the second actuator when the first actuator is actuated.

5. The method of claim 4, further comprising electronically disabling the first actuator when the second actuator is actuated.

6. The method of claim 1, wherein the step of activating the first motor to move the first jaw toward the second jaw comprises moving a rocker switch of the set of actuators in a first direction.

7. The method of claim 6, further comprising:

deactivating the second motor;

moving the rocker switch in a second direction that is opposite the first direction to move the first jaw away from the second jaw; and removing the rod from the first and second jaws of the attachment.

* * * * *